(12) United States Patent
Kunugise et al.

(10) Patent No.: US 10,249,028 B2
(45) Date of Patent: Apr. 2, 2019

(54) IMAGING DEVICE, IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventors: Takashi Kunugise, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 15/783,471

(22) Filed: Oct. 13, 2017

(65) Prior Publication Data

US 2018/0047140 A1 Feb. 15, 2018

Related U.S. Application Data

(63) Continuation of application No. PCT/JP2016/061511, filed on Apr. 8, 2016.

(30) Foreign Application Priority Data

Apr. 16, 2015 (JP) .................. 2015-084394

(51) Int. Cl.
  *G06K 9/40* (2006.01)
  *G06T 5/00* (2006.01)
  (Continued)

(52) U.S. Cl.
  CPC .............. *G06T 5/003* (2013.01); *G02B 13/18* (2013.01); *G02B 15/16* (2013.01); *G03B 17/14* (2013.01);
  (Continued)

(58) Field of Classification Search
  None
  See application file for complete search history.

(56) References Cited

U.S. PATENT DOCUMENTS

2014/0022417 A1 1/2014 Yokoyama et al.
2014/0198231 A1 7/2014 Itoh

FOREIGN PATENT DOCUMENTS

| JP | 2014-21312 A | 2/2014 |
|----|--------------|--------|
| JP | 2014-21313 A | 2/2014 |
| JP | 2014-138196 A | 7/2014 |

OTHER PUBLICATIONS

Japanese Decision to Grant a Patent, dated Nov. 29, 2017, for counterpart Japanese Application No. 2017-512511, with an English machine translation.

(Continued)

*Primary Examiner* — Stephen P Coleman
(74) *Attorney, Agent, or Firm* — Birch, Stewart, Kolasch & Birch, LLP

(57) ABSTRACT

An optical system has the entire angle of view at a wide-angle end of not smaller than 90 degrees. A spatial frequency at which an MTF of the optical system acquired using an evaluation wavelength in a region of an image formation plane in which the distance from the center of the image formation plane is not less than 80% and less than 95% of half of the length of a diagonal line of an imaging surface of an imaging element image is not more than 30% is higher at the wide-angle end than at a telephoto end. When $F \geq \sqrt{(Fw \times Ft)}$ is satisfied (where F indicates the focal length of the optical system when the target image is captured, Fw indicates the focal length at the wide-angle end, and Ft indicates the focal length at the telephoto end), a sharpening processing unit performs a restoration process based on an optical transfer function of the optical system as a sharpening process.

20 Claims, 25 Drawing Sheets

(51) Int. Cl.
G02B 13/18 (2006.01)
G02B 15/16 (2006.01)
G03B 17/14 (2006.01)
H04N 1/409 (2006.01)
H04N 5/232 (2006.01)
G06T 5/10 (2006.01)
H04N 1/401 (2006.01)
H04N 5/357 (2011.01)

(52) U.S. Cl.
CPC ............... *G06T 5/00* (2013.01); *G06T 5/10* (2013.01); *H04N 1/401* (2013.01); *H04N 1/409* (2013.01); *H04N 5/232* (2013.01); *H04N 5/23209* (2013.01); *H04N 5/3572* (2013.01); *G03B 2205/0046* (2013.01)

(56) References Cited

OTHER PUBLICATIONS

International Search Report (Form PCT/ISA/210) for International Application No. PCT/JP2016/061511, dated Jun. 7, 2016, with English translation.
Japanese Office Action for Japanese Application No. 2017-512511, dated Oct. 20, 2017.
Written Opinion of the International Searching Authority (Form PCT/ISA/237) for International Application No. PCT/JP2016/061511, dated Jun. 7, 2016, with English translation.

FIG. 11

| TABLE 1 | | | | | |
|---|---|---|---|---|---|
| R | r | D | Nd | vd | θgF |
| 1 | 44.2364 | 1.32 | 1.69895 | 30.13 | 0.6030 |
| 2 | 10.3760 | 3.75 | | | |
| 3 | ∞ | 0.86 | 1.80000 | 29.84 | 0.6017 |
| 4 | 9.9033 | 2.96 | | | |
| 5 | -39.3417 | 0.89 | 1.51742 | 52.43 | 0.5564 |
| 6 | 13.3670 | 3.44 | 1.92286 | 20.88 | 0.6388 |
| 7 | -69.9109 | 1.11 | | | |
| 8 | -15.1676 | 0.81 | 1.56883 | 56.36 | 0.5489 |
| 9 | -25.8550 | VARIABLE D10 | | | |
| 10 (STOP) | - | VARIABLE D11 | | | |
| 11 | 14.3963 | 3.78 | 1.56868 | 58.27 | 0.5536 |
| 12 | -187.999 | 0.22 | | | |
| 13 | -1262.9268 | 0.76 | 1.56732 | 42.82 | 0.5731 |
| 14 | 20.0662 | 1.17 | | | |
| 15 | 17.2665 | 4.16 | 1.49700 | 81.54 | 0.5375 |
| 16 | -12.4325 | 0.21 | | | |
| 17 | 34.2619 | 0.98 | 1.90366 | 31.32 | 0.5948 |
| 18 | 7.1980 | 3.99 | 1.49700 | 81.54 | 0.5375 |
| 19 | -24.2428 | VARIABLE D21 | | | |
| 20 | ∞ | 1.50 | 1.51633 | 64.14 | 0.5353 |
| 21 | ∞ | 6.50 | | | |
| Sim | | | | | |

FIG. 12

| TABLE 2 | | | | | | |
|---|---|---|---|---|---|---|
| | FOCAL LENGTH | Fno | 2ω | VARIABLE D10 | VARIABLE D11 | VARIABLE D21 |
| WIDE-ANGLE END | 2.89 | 1.34 | 151.3 | 16.28 | 8.58 | 1.00 |
| TELEPHOTO END | 7.82 | 2.15 | 48.6 | 1.66 | 1.38 | 8.20 |

FIG. 13

TABLE 3

| R | KA | A3 | A4 | A5 | A6 |
|---|---|---|---|---|---|
| 11 | 0.0000000E+00 | 2.4731528E-05 | -1.4767865E-04 | 1.2847457E-05 | -2.0140639E-06 |
| 12 | 0.0000000E+00 | 1.8590957E-05 | 1.5466911E-04 | 2.4768486E-06 | 9.8925372E-07 |

| R | A7 | A8 | A9 | A10 | A11 |
|---|---|---|---|---|---|
| 11 | -1.5435412E-07 | -3.2362239E-09 | 2.2106502E-09 | -1.2205481E-10 | -6.3333639E-14 |
| 12 | -6.5535922E-07 | 6.5461995E-08 | -1.7615358E-09 | 4.9113926E-11 | 2.4295615E-13 |

| R | A12 | A13 | A14 | A15 | A16 |
|---|---|---|---|---|---|
| 11 | -7.0882731E-13 | -1.1822955E-14 | -8.3289647E-15 | -3.7639460E-15 | -1.1749231E-15 |
| 12 | -6.5507494E-14 | -9.7015623E-15 | -2.2335941E-16 | -2.5893401E-17 | -5.7284309E-16 |

| R | A17 | A18 | A19 | A20 | |
|---|---|---|---|---|---|
| 11 | -5.8619725E-17 | 2.1869925E-17 | 1.8951588E-18 | 3.0181727E-19 | |
| 12 | -3.0889926E-16 | 5.1694973E-17 | 2.2423508E-18 | 1.0525292E-19 | |

FIG. 16

| | TABLE 4 | | | | |
|---|---|---|---|---|---|
| R | r | D | Nd | vd | θgF |
| 1 | 27.7558 | 1.39 | 1.816 | 46.62 | 0.5568 |
| 2 | 11.3755 | 3.38 | | | |
| 3 | 20.5844 | 1.08 | 1.816 | 46.62 | 0.5568 |
| 4 | 8.8654 | 2.9 | | | |
| 5 | 20.4189 | 1.23 | 1.788 | 47.37 | 0.5559 |
| 6 | 9.8415 | 3.05 | | | |
| 7 | -57.3998 | 3.81 | 1.83481 | 42.73 | 0.5648 |
| 8 | 23.087 | 1 | | | |
| 9 | 19.8954 | 2.36 | 1.95906 | 17.47 | 0.6598 |
| 10 | 119.8999 | VARIABLE D10 | | | |
| 11 (STOP) | - | VARIABLE D11 | | | |
| 12 | 14.3963 | 3.78 | 1.568675 | 58.267 | 0.5536 |
| 13 | -18.7999 | 0.24 | | | |
| 14 | ∞ | 0.76 | 1.581439 | 40.75 | 0.5774 |
| 15 | 24.025 | 0.96 | | | |
| 16 | 17.426 | 4.16 | 1.496999 | 81.54 | 0.5375 |
| 17 | -12.6873 | 0.43 | | | |
| 18 | 34.0024 | 0.69 | 1.903658 | 31.32 | 0.5947 |
| 19 | 6.786 | 4.27 | 1.496999 | 81.54 | 0.5375 |
| 20 | -22.0524 | VARIABLE D21 | | | |
| 21 | ∞ | 1.50 | 1.51633 | 64.14 | 0.5353 |
| 22 | ∞ | 6.35 | | | |
| Sim | | | | | |

FIG. 17

| | TABLE 5 | | | | | |
|---|---|---|---|---|---|---|
| | FOCAL LENGTH | Fno | 2ω | VARIABLE D10 | VARIABLE D11 | VARIABLE D21 |
| WIDE-ANGLE END | 2.242 | 1.34 | 164.3 | 13.980 | 9.030 | 1.000 |
| TELEPHOTO END | 5.965 | 2.17 | 62.7 | 1.797 | 1.539 | 8.491 |

FIG. 18

TABLE 6

| R | KA | A3 | A4 | A5 | A6 |
|---|---|---|---|---|---|
| 12 | 0.0000000E+00 | 2.4731528E-05 | -1.4767865E-04 | 1.2847457E-05 | -2.0140639E-06 |
| 13 | 0.0000000E+00 | 1.8590957E-05 | 1.5466911E-04 | 2.4768486E-06 | 9.8925372E-07 |

| R | A7 | A8 | A9 | A10 | A11 |
|---|---|---|---|---|---|
| 12 | -1.5435412E-07 | -3.2362239E-09 | 2.2106502E-09 | -1.2205481E-10 | -6.3333639E-14 |
| 13 | -6.5535922E-07 | 6.5461995E-08 | -1.7615358E-09 | 4.9113926E-11 | 2.4295615E-13 |

| R | A12 | A13 | A14 | A15 | A16 |
|---|---|---|---|---|---|
| 12 | -7.0882731E-13 | -1.1822955E-14 | -8.3289647E-15 | -3.7639460E-15 | -1.1749231E-15 |
| 13 | -5.6507494E-14 | -9.7015623E-15 | -2.2335941E-16 | -2.5893401E-17 | -5.7284309E-16 |

| R | A17 | A18 | A19 | A20 | |
|---|---|---|---|---|---|
| 12 | -5.8619725E-17 | 2.1869925E-17 | 1.8951588E-18 | 3.0181727E-19 | |
| 13 | -3.0889926E-16 | 5.1694973E-17 | 2.2423508E-18 | 1.0525292E-19 | |

# IMAGING DEVICE, IMAGE PROCESSING DEVICE, IMAGE PROCESSING METHOD, PROGRAM, AND RECORDING MEDIUM

CROSS-REFERENCE TO RELATED APPLICATIONS

The present application is a Continuation of PCT International Application No. PCT/JP2016/061511 filed on Apr. 8, 2016 claiming priority under 35 U.S.C. § 119(a) to Japanese Patent Application No. 2015-084394 filed on Apr. 16, 2015. Each of the above applications is hereby expressly incorporated by reference, in their entirety, into the present application.

BACKGROUND OF THE INVENTION

1. Field of the Invention

The present invention relates to an imaging device, an image processing device, an image processing method, a program, and a recording medium, and more particularly, to a technique for improving the quality of an image captured using an optical system with a variable focal length.

2. Description of the Related Art

A captured image obtained by an imaging device, such as a digital camera, includes a degradation component such as blurring or distortion caused by, for example, the aberration of an optical system. It is preferable to perform imaging, using an optical system with small aberration, in order to obtain a high-quality image. However, the optical system that can be actually used is limited due to, for example, size and costs. An optical system with a high performance is not necessarily used.

Therefore, a method has been proposed which reduces the number of degradation components using image processing after imaging.

JP2014-138196A discloses an imaging device that performs an image restoration process, using an image restoration filter created on the basis of an optical transfer function (OTF).

SUMMARY OF THE INVENTION

A surveillance camera used for security or recording requires a function that can capture wide-angle images in order to acquire wide-range images. In contrast, the surveillance camera requires a function that can perform telephoto imaging in order to acquire the detailed information of a specific object, if necessary. Therefore, in recent years, there is an increasing demand for a surveillance camera including a zoom lens with a variable focal length.

In general, in the case of, for example, a surveillance camera, importance is attached to the quality of a peripheral portion of a captured image in addition to the quality of a central portion of the captured image. In particular, importance tends to be attached to the quality of a peripheral portion of a wide-angle image. During imaging using a zoom lens, the degradation of image quality, such as a reduction in the resolution of a peripheral portion of an image, is likely to occur on the wide-angle side. In a case in which, for example, an aspheric lens is used to reduce the degradation of the quality of a peripheral portion of the image on the wide-angle side, this has a great effect on the performance of the lens on the telephoto side, which causes a very large variation in aberration on the telephoto side. Therefore, manufacturing sensitivity increases and yield is reduced. As a result, the cost of lenses tends to increase.

For this reason, it is considered that a restoration process based on an optical transfer function is performed as image processing to improve the quality of an image captured using a zoom lens on both the wide-angle side and the telephoto side.

However, the restoration process based on the optical transfer function is not effective in all situations. For example, even in a case in which the restoration process based on the optical transfer function is applied to an image with an excessively large amount of blurring, it is difficult to remove blurring and there is a concern that image quality will be degraded. That is, in a case in which the amount of blurring in the image to be processed is not excessively large and is not excessively small, the restoration process based on the optical transfer function has a great effect.

Therefore, a zoom lens that is designed such that the amount of blurring which occurs in a captured image falls an optimum range and the restoration process based on the optical transfer function can be combined with each other to provide an image having high quality in the entire zoom range from the wide-angle side to the telephoto side. Assuming that the restoration process based on the optical transfer function is performed, a lens that allows a certain degree of degradation of image quality, such as blurring, can be designed and extra resources can be used to improve other performances of lenses as a trade-off with the allowance of the degradation of image quality.

In general, in the surveillance camera, priority is given to image quality on the wide-angle side over image quality on the telephoto side. For this reason, in a case in which an optical system for a surveillance camera is designed, it is preferable to improve the optical performance of the wide-angle side even though the optical performance of the telephoto side is sacrificed. Therefore, a zoom lens that is used for a surveillance camera and enables the surveillance camera to capture an image with a sufficiently wide angle of view is designed such that priority is given to the optical performance of the wide-angle side and a restoration process is applied to an image captured on the telephoto side. In this way, it is possible to provide an image having high quality in the entire zoom range.

However, in the imaging device according to the related art, the optical design of a zoom lens is not optimized on the premise that a restoration process is performed in order to capture a high-quality image in the entire zoom range. In particular, there is no document that discloses the optical design of "a super-wide-angle zoom lens with a maximum diagonal angle of view of 90 degrees or more" which is suitable for, for example, a surveillance camera on the premise of a restoration process. For example, the imaging device disclosed in JP2014-138196A is configured on the premise of design concept different from the optimization of the optical design on the premise of the restoration process, has a relatively narrow angle of view at which images can be captured, and performs only imaging at a maximum entire angle of view of "74 degrees" (a half angle of view of "37" degrees). Therefore, the imaging device is not necessarily suitable for a wide-angle imaging device such as a surveillance camera.

In an imaging device for a surveillance camera, the quality of a peripheral portion of an image tends to be seen as being as important as the quality of a central portion of the image, or tends to be seen as being more important than the quality of the central portion. In the imaging device disclosed in JP2014-138196A, priority is given to the quality of the central portion of the image. In the imaging device disclosed in JP2014-138196A, in a case in which the restoration process is performed for all pixels in the entire zoom range, a huge amount of filtering is required. For this reason, the main object of the imaging device is to reduce the amount of filtering and the amount of computation. In the imaging device disclosed in JP2014-138196A, in order to achieve the object while giving priority to the quality of the central portion of the image, lenses are designed such that coma aberration is allowed in the peripheral portion of the image while aberration is prevented in the central portion of the image in a specific zoom range and the quality of the peripheral portion of the image is restored by image processing.

As such, the imaging device disclosed in JP2014-138196A is not necessarily suitable for a wide-angle imaging technique applied to, for example, a surveillance camera. JP2014-138196A does not disclose any technique for providing a high-quality image in the range from the wide-angle side to the telephoto side while giving priority to the quality of a peripheral portion of an image during the wide-angle imaging.

The invention has been made in view of the above-mentioned problems and an object of the invention is to provide a technique which optimizes a combination of the optical characteristics of an optical system and a restoration process based on an optical transfer function to improve the quality of an image captured using an optical system with a variable focal length.

According to an aspect of the invention, there is provided an imaging device comprising: an optical system; an imaging element that receives imaging light through the optical system and outputs a target image; and a sharpening processing unit that performs a sharpening process for the target image on the basis of optical imaging conditions indicating information of the optical system when the target image is captured. A focal length of the optical system is variable. An entire angle of view of the optical system at a wide-angle end is greater than 90 degrees. A spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane is equal to or greater than 80% and less than 95% of half of a length of a diagonal line of an imaging surface of the imaging element is equal to or less than 30% is higher at the wide-angle end than at a telephoto end of the optical system. In a case in which the focal length of the optical system when the target image is captured is represented by F, the focal length of the optical system at the wide-angle end is represented by Fw, and the focal length of the optical system at the telephoto end is represented by Ft, the sharpening processing unit determines whether a condition represented by $F \geq \sqrt{(Fw \times Ft)}$ is satisfied on the basis of the optical imaging conditions. In a case in which the condition represented by $F \geq \sqrt{(Fw \times Ft)}$ is satisfied, the sharpening processing unit performs a restoration process based on an optical transfer function of the optical system as the sharpening process.

According to this aspect, the modulation transfer function (MTF) of the optical system and the restoration process based on the optical transfer function can be optimally combined with each other to improve the quality of an image captured using the optical system with a variable focal length according to the focal length.

According to another aspect of the invention, there is provided an image processing device comprising: an image acquisition unit that acquires a target image; a condition acquisition unit that acquires optical imaging conditions indicating information of an optical system when the target image is captured; and a sharpening processing unit that performs a sharpening process for the target image on the basis of the optical imaging conditions. In a case in which the optical imaging conditions satisfy a first imaging condition and a second imaging condition, the sharpening processing unit performs a restoration process based on an optical transfer function of the optical system as the sharpening process. The first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane is equal to or greater than 80% and less than 95% of half of a length of a diagonal line of an imaging surface of the imaging element is equal to or less than 30% is higher at the wide-angle end than at a telephoto end of the optical system. In a case in which the focal length of the optical system when the target image is captured is represented by F, the focal length of the optical system at the wide-angle end is represented by Fw, and the focal length of the optical system at the telephoto end is represented by Ft, the second imaging condition is represented by $F \geq \sqrt{(Fw \times Ft)}$.

According to this aspect, the MTF (optical performance) of the optical system and the restoration process based on the optical transfer function can be optimally combined with each other to improve the quality of an image captured using the optical system with a variable focal length according to the focal length.

Preferably, the sharpening processing unit acquires a brightness component of the target image and performs the restoration process for only the brightness component.

According to this aspect, it is possible to simply perform the restoration process based on the optical transfer function for the brightness component.

Preferably, in a case in which the optical imaging conditions satisfy the first imaging condition and satisfy a third imaging condition represented by $F < \sqrt{(Fw \times Ft)}$, the sharpening processing unit performs a lateral chromatic aberration correction process as the sharpening process.

According to this aspect, the focal length of the optical system when the target image is captured is small. Therefore, even in a case in which the restoration process is not performed, the quality of an image can be improved by the lateral chromatic aberration correction process.

Preferably, the sharpening processing unit adjusts a magnification of a color component forming the target image to perform the lateral chromatic aberration correction process.

According to this aspect, it is possible to simply perform the lateral chromatic aberration correction process.

Preferably, the sharpening processing unit performs the lateral chromatic aberration correction process on the basis of the optical transfer function.

According to this aspect, it is possible to simply perform the lateral chromatic aberration correction process.

Preferably, the target image includes at least a first color component and a second color component and the sharpening processing unit applies a filter based on the optical transfer function which is related to the first color component to the first color component, applies a filter based on the optical transfer function which is related to the second color component to the second color component to perform the lateral chromatic aberration correction process.

According to this aspect, it is possible to accurately perform the lateral chromatic aberration correction process, using the filter based on the optical transfer function.

Preferably, in a case in which the optical imaging conditions satisfy the first imaging condition and satisfy the third imaging condition represented by $F<\sqrt{(Fw \times Ft)}$, the sharpening processing unit performs the restoration process for only a region of the target image in which a distance from a center of the target image is equal to or greater than 80% of half of the length of the diagonal line of the imaging surface.

According to this aspect, it is possible to improve the quality of a peripheral region of an image, without damaging the quality of a central region of the image.

Preferably, the restoration process is performed in a case in which the optical imaging conditions satisfy the first imaging condition and the second imaging condition and satisfy a condition that the entire angle of view of the optical system at the wide-angle end is greater than 100 degrees.

According to this aspect, it is possible to improve the quality of a wide-angle image captured using the optical system of which the entire angle of view is greater than 100 degrees according to the focal length.

Preferably, the restoration process is performed in a case in which the optical imaging conditions satisfy the first imaging condition and the second imaging condition and satisfy a condition that the spatial frequency at which the value of the MTF acquired using the evaluation wavelength in a region of the image formation plane of the optical system in which the distance from the center of the image formation plane is equal to or greater than 70% of half of the length of the diagonal line of the imaging surface is equal to or less than 30% is higher at the wide-angle end than at the telephoto end of the optical system.

According to this aspect, it is possible to more effectively improve the quality of the target image according to the focal length.

According to still another aspect of the invention, there is provided an imaging device comprising: an optical system mounting unit to which an optical system is detachably attached; an imaging element that receives imaging light through the optical system mounted on the optical system mounting unit and outputs an image; and the image processing device. The image output from the imaging element is the target image.

According to this aspect, the MTF (optical performance) of the optical system and the restoration process based on the optical transfer function can be optimally combined with each other to improve the quality of an image captured using the optical system with a variable focal length according to the focal length.

According to yet another aspect of the invention, there is provided an imaging device comprising: a camera device including an optical system, an imaging element that receives imaging light through the optical system and outputs an image, a camera-side control processing unit that is connected to the imaging element, and a camera-side communication unit that is connected to the camera-side control processing unit; and a control terminal including a terminal-side communication unit that can communicate with the camera-side communication unit, a terminal-side control processing unit that is connected to the terminal-side communication unit, and a user interface that is connected to the terminal-side control processing unit. At least one of the camera-side control processing unit or the terminal-side control processing unit includes the image processing device and the image output from the imaging element is the target image.

According to this aspect, the MTF (optical performance) of the optical system and the restoration process based on the optical transfer function can be optimally combined with each other to improve the quality of an image captured using the optical system with a variable focal length according to the focal length.

According to still yet another aspect of the invention, there is provided an image processing method comprising: a step of acquiring a target image; a step of acquiring optical imaging conditions indicating information of an optical system when the target image is captured; and a step of performing a sharpening process for the target image on the basis of the optical imaging conditions. In a case in which the optical imaging conditions satisfy a first imaging condition and a second imaging condition, a restoration process based on an optical transfer function of the optical system is performed as the sharpening process. The first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane of the optical system is equal to or greater than 80% and less than 95% of half of a length of a diagonal line of an imaging surface of an imaging element which outputs the target image is equal to or less than 30% is higher at the wide-angle end than at a telephoto end of the optical system. In a case in which the focal length of the optical system when the target image is captured is represented by F, the focal length of the optical system at the wide-angle end is represented by Fw, and the focal length of the optical system at the telephoto end is represented by Ft, the second imaging condition is represented by $F \geq \sqrt{(Fw \times Ft)}$.

According to yet still another aspect of the invention, there is provided a program that causes a computer to perform: a step of acquiring a target image; a step of acquiring optical imaging conditions indicating information of an optical system when the target image is captured; and a step of performing a sharpening process for the target image on the basis of the optical imaging conditions. In a case in which the optical imaging conditions satisfy a first imaging condition and a second imaging condition, a restoration process based on an optical transfer function of the optical system is performed as the sharpening process. The first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane of the optical system is equal to or greater than 80% and less than 95% of half of a length of a diagonal line of an imaging surface of an imaging element which outputs the target image is equal to or less than 30% is higher at the wide-angle end than at a telephoto end of the optical system. In a case in which the focal length of the optical system when the target image is captured is represented by F, the focal length of the optical system at the wide-angle end is represented by Fw, and the focal length of the optical system at the telephoto end is represented by Ft, the second imaging condition is represented by F≥√(Fw×Ft).

According to still yet another aspect of the invention, there is provided a non-transitory computer-readable tangible recording medium that stores a program causing a computer to perform: a step of acquiring a target image; a step of acquiring optical imaging conditions indicating information of an optical system when the target image is captured; and a step of performing a sharpening process for the target image on the basis of the optical imaging conditions. In a case in which the optical imaging conditions satisfy a first imaging condition and a second imaging condition, a restoration process based on an optical transfer function of the optical system is performed as the sharpening process. The first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane of the optical system is equal to or greater than 80% and less than 95% of half of a length of a diagonal line of an imaging surface of an imaging element which outputs the target image is equal to or less than 30% is higher at the wide-angle end than at a telephoto end of the optical system. In a case in which the focal length of the optical system when the target image is captured is represented by F, the focal length of the optical system at the wide-angle end is represented by Fw, and the focal length of the optical system at the telephoto end is represented by Ft, the second imaging condition is represented by F≥√(Fw×Ft).

According to the invention, the MTF (optical performance) of the optical system and the restoration process based on the optical transfer function can be optimally combined with each other to improve the quality of an image captured using the optical system with a variable focal length according to the focal length.

BRIEF DESCRIPTION OF THE DRAWINGS

FIG. 10A illustrates the arrangement of the optical system at a telephoto end, and FIG. 10B illustrates the arrangement of the optical system at a wide-angle end.

FIG. 11 is a table (Table 1) illustrating the basic data of the optical system according to Example 1.

FIG. 12 is a table (Table 2) illustrating the focal length, the F-number ("Fno"), the entire angle of view ("2ω") of the entire optical system according to Example 1 and a variable surface interval ("variable D10 (a distance between a fifth lens and a stop)", "variable D11 (a distance between the stop and a sixth lens)", and "variable D21 (a distance between a tenth lens and an optical member)") on an optical axis in the entire optical system at the wide-angle end and the telephoto end.

FIG. 13 is a table (Table 3) illustrating aspheric coefficients ("KA" and "Ai (i=3 to 20)") of aspheric lens (particularly, surface numbers "12 (see "R12" in FIG. 10A)" and "13 (see "R13" in FIG. 10A)") of the optical system according to Example 1.

FIG. 15A illustrates the arrangement of the optical system at a telephoto end, and FIG. 15B illustrates the arrangement of the optical system at a wide-angle end.

FIG. 16 is a table (Table 4) illustrating the basic data of the optical system according to Example 2.

FIG. 17 is a table (Table 5) illustrating the focal length, the F-number ("Fno"), the entire angle of view ("2ω") of the entire optical system according to Example 2 and a variable surface interval ("variable D10 (a distance between a fifth lens and a stop)", "variable D11 (a distance between the stop and a sixth lens)", and "variable D21 (a distance between a tenth lens and an optical member)") on an optical axis in the entire optical system at the wide-angle end and the telephoto end.

FIG. 18 is a table (Table 6) illustrating aspheric coefficients ("KA" and "Ai (i=3 to 20)") of aspheric lens (particularly, surface numbers "12 (see "R12" in FIG. 15A)" and "13 (see "R13" in FIG. 15A)") of the optical system according to Example 2.

DESCRIPTION OF THE PREFERRED EMBODIMENTS

Hereinafter, embodiments of the invention will be described with reference to the drawings. In the following embodiments, an example in which the invention is applied to a surveillance camera system will be described. However, the object to which the invention is applied is not limited thereto and the invention can be applied to an imaging device, an image processing device, an image processing method, a program, and a recording medium other than the surveillance camera system.

In general, in a wide-angle zoom lens, a change in an optical performance and aberration with a change in a zoom magnification on a wide-angle side is relatively large. The change in the optical performance and aberration tends to be reduced toward a telephoto side. Therefore, it is easy to apply the same process to a wider zoom range in a case in which a restoration process is performed for an image captured on the telephoto side than in a case in which the restoration process is performed for an image captured on the wide-angle side. As a result, even in a case in which the region in which the process is performed is expanded, it is possible to respond to a wide region with a small change.

The inventors of the inventor conducted a thorough study on the above-mentioned mechanism and found a new method which optimized a combination of the optical design of an optical system that had a variable focal length and enabled wide-angle imaging and a restoration process based on an optical transfer function to provide an image having high quality in the entire zoom range to a user.

That is, in an imaging device according to this embodiment, such as a surveillance camera system, an optical system (zoom lens) with a variable focal length has the lens design which gives priority to the quality of an image captured on the wide-angle side over the quality of an image captured on the telephoto side and image processing based on the optical transfer function is performed for the image captured on the telephoto side. As such, as the optical system having the design in which the optical performance on the telephoto side is sacrificed for the improvement of the optical performance on the wide-angle side, for example, an optical system is used in which a limiting frequency that is capable of ensuring 30% or more as the value of an MTF in a peripheral portion of a lens is higher at a wide-angle end than at a telephoto end. In a case in which the optical system is designed and image processing is performed under this condition, it is possible to provide a high-quality captured image with a high resolution in the entire zoom range.

Next, a specific embodiment will be described.

Figure 1:
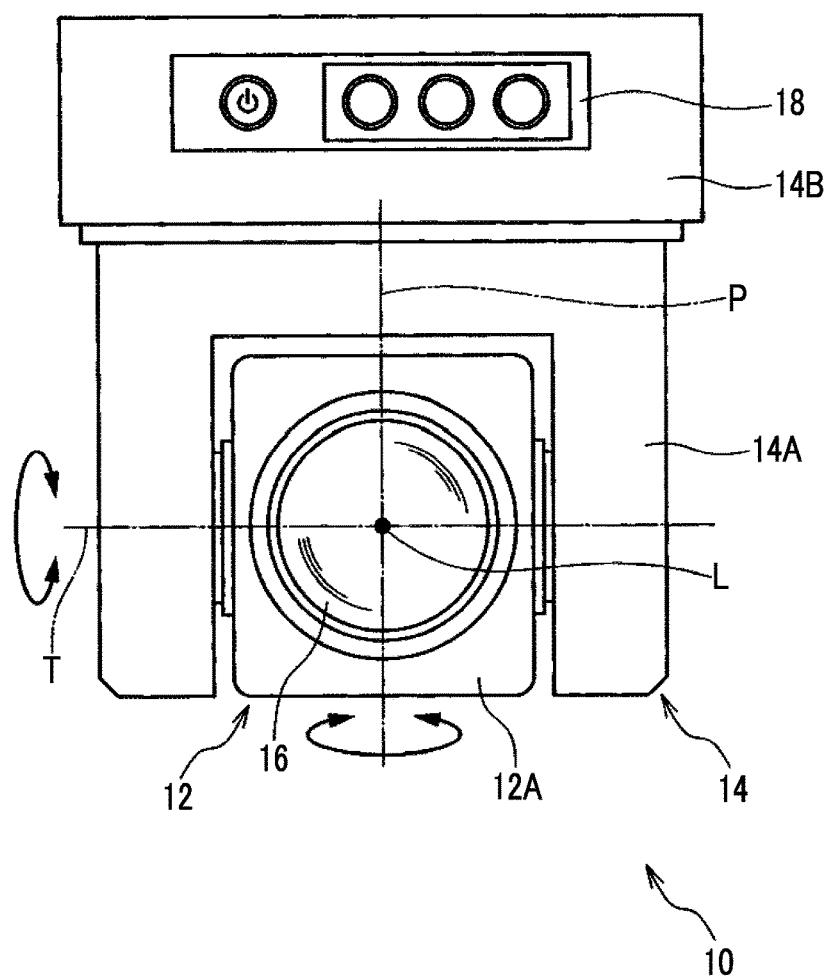
FIG. 1 is a diagram illustrating the outward appearance of an example of a camera device used in a surveillance camera system.

FIG. 1 is a diagram illustrating the outward appearance of an example of a camera device 10 used in a surveillance camera system.

In this example, the camera device 10 has a pan function and a tilt function and can capture images under the control of a control terminal (see FIG. 2) which will be described below. That is, the camera device 10 includes an imaging unit 12 that captures an image of an object and a support unit 14 that supports the imaging unit 12 such that it can be panned and tilted.

The imaging unit 12 includes an optical system 16 that is supported by an imaging support unit 12A. The optical system 16 is driven by a lens driving unit (not illustrated) such that the focus, zoom, and stop aperture thereof are adjusted.

The support unit 14 includes a support frame 14A and a mount 14B and the mount 14B supports the support frame 14A such that the support frame 14A can be rotated on a pan axis P. A control panel 18 is provided in the mount 14B. The user can operate various operation buttons, such as a power button, included in the control panel 18 to control the camera device 10. The support frame 14A has a groove-shaped space in which the imaging unit 12 is provided and supports the imaging unit 12 such that the imaging unit 12 can be rotated on a tilt axis T perpendicular to the pan axis P. A tilt driving unit (not illustrated) that rotates the imaging unit 12 on the tilt axis T is provided in the support frame 14A and a pan driving unit (not illustrated) that rotates the support frame 14A on the pan axis P is provided in the mount 14B. The optical axis L of the optical system 16 that is supported so as to be panned and tilted as described above is perpendicular to the pan axis P and the tilt axis T.

FIG. 1 illustrates the camera device 10 that can be panned and tilted. However, the camera device 10 does not necessarily have a pan/tilt mechanism and the imaging unit 12 may be fixed to the support unit 14.

Figure 2:
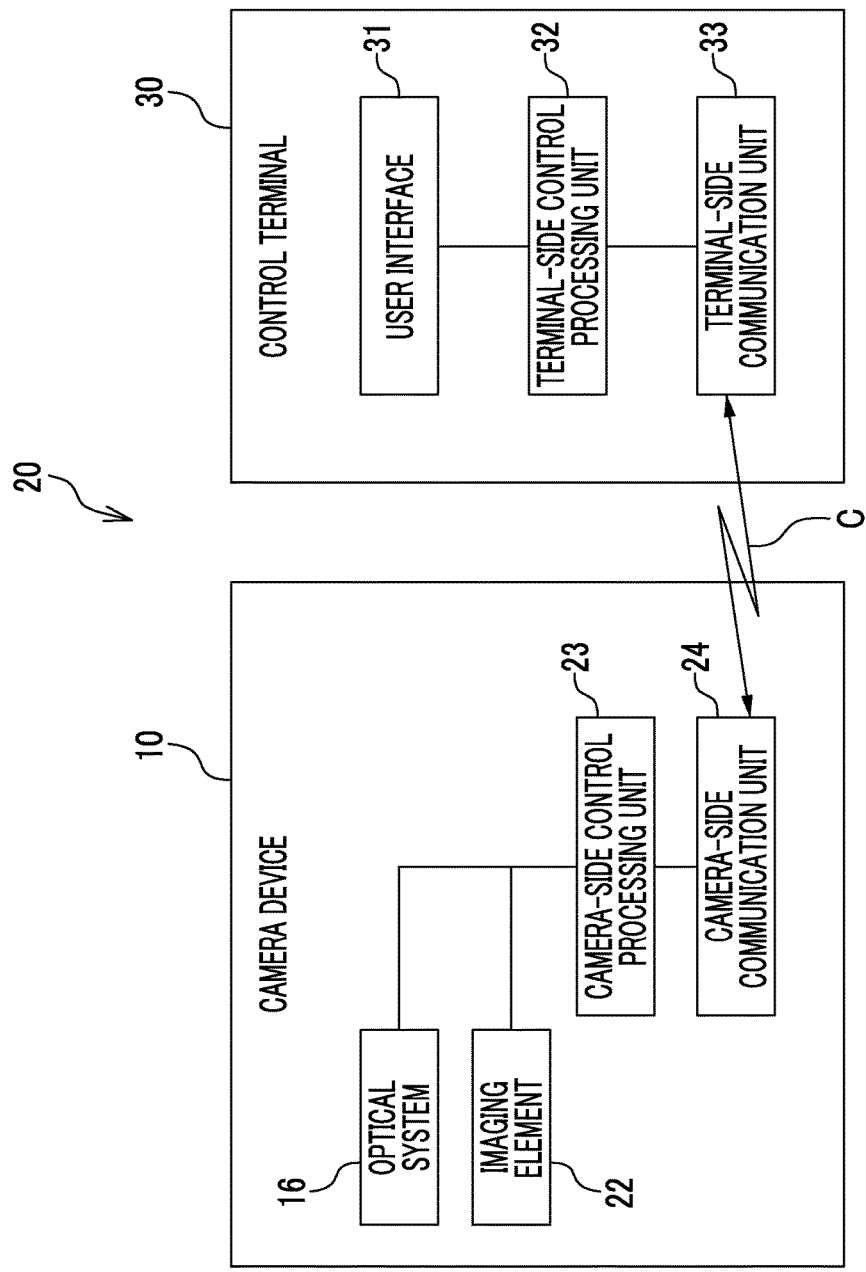
FIG. 2 is a block diagram illustrating an example of the functional configuration of an imaging device and particularly illustrates an example of the functional configuration suitable for the surveillance camera system.

FIG. 2 is a block diagram illustrating an example of the functional configuration of an imaging device and particularly illustrates an example of the preferred functional configuration of a surveillance camera system 20. For convenience of explanation, FIG. 2 illustrates only the main functional configuration of imaging and communication. For example, the pan driving unit or the tilt driving unit is not illustrated in FIG. 2.

In this example, the surveillance camera system 20 includes the camera device 10 and a control terminal 30 that can control the camera device 10.

The camera device 10 includes the optical system 16, an imaging element 22 that receives imaging light through the optical system 16 and outputs an image (target image), a camera-side control processing unit 23 connected to the optical system 16 and the imaging element 22, and a camera-side communication unit 24 connected to the camera-side control processing unit 23. The control terminal 30 includes a terminal-side communication unit 33 that can perform communication (see letter "C" in FIG. 2) with the camera-side communication unit 24, a terminal-side control processing unit 32 connected to the terminal-side communication unit 33, and a user interface 31 connected to the terminal-side control processing unit 32.

The optical system 16 includes a plurality of lenses and a stop and guides imaging light from an object to the imaging element 22. The imaging element 22 is an image sensor such as a charge coupled device (CCD) or a complementary metal oxide semiconductor (CMOS) sensor. The user interface 31 of the control terminal 30 includes a display unit that can present various kinds of information to the user, in addition to an operation unit such as buttons or a touch panel that can be directly operated by the user.

The camera-side control processing unit 23 controls the optical system 16, the imaging element 22, and the camera-side communication unit 24 and performs image processing for, for example, an image output from the imaging element 22 as the target image. The terminal-side control processing unit 32 controls the user interface 31 and the terminal-side communication unit 33, receives, for example, data or a command input by the user through the user interface 31, and reflects the data or the command in various processes. In addition, the terminal-side control processing unit 32 receives data or a command transmitted from the camera device 10 (camera-side communication unit 24) through the terminal-side communication unit 33 and reflects the data or the command in various processes.

The camera-side control processing unit 23 and the terminal-side control processing unit 32 can transmit and receive, for example, image data or other data through the communication C between the camera-side communication unit 24 and the terminal-side communication unit 33. Therefore, the user can input various kinds of data and various commands to the terminal-side control processing unit 32 through the user interface 31 of the control terminal 30 to control the camera device 10. That is, data or a command for controlling the camera-side control processing unit 23 is transmitted from the terminal-side control processing unit 32 to the camera-side control processing unit 23 through the terminal-side communication unit 33 and the camera-side communication unit 24 to control the optical system 16 and the imaging element 22 through the camera-side control processing unit 23.

In addition, the image output from the imaging element 22 may be processed by the camera-side control processing unit 23, the terminal-side control processing unit 32, or both the camera-side control processing unit 23 and the terminal-side control processing unit 32. That is, the image output from the imaging element 22 may be processed by the camera-side control processing unit 23 and then transmitted to the terminal-side control processing unit 32 through the camera-side communication unit 24 and the terminal-side communication unit 33. Alternatively, the image may be processed by the terminal-side control processing unit 32.

Therefore, in the surveillance camera system 20 according to this example, an image processing device which will be described below may be provided in at least one of the camera-side control processing unit 23 or the terminal-side control processing unit 32.

Figure 3:
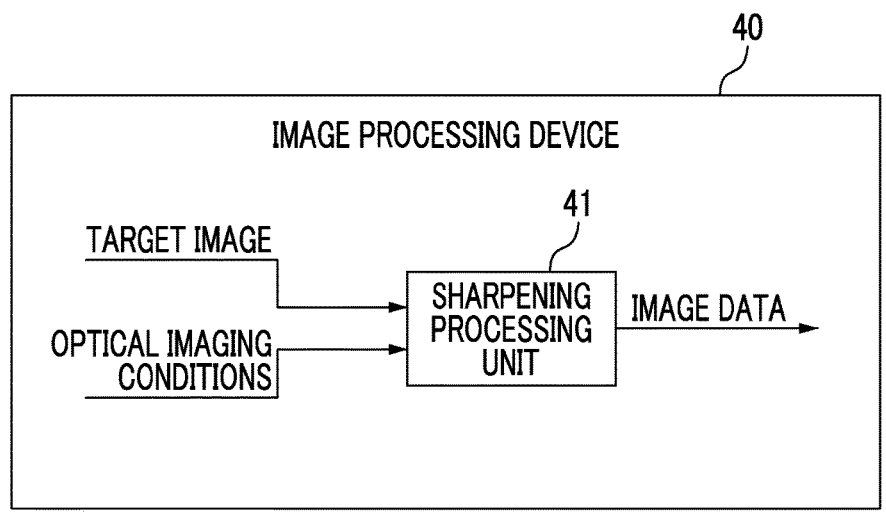
FIG. 3 is a block diagram illustrating an example of the functional configuration of an image processing device.

FIG. 3 is a block diagram illustrating an example of the functional configuration of an image processing device 40. In this example, the image processing device 40 includes a sharpening processing unit 41. A target image and data for optical imaging conditions are input to the sharpening processing unit 41.

The target image is an image output from the imaging element 22 and is directly or indirectly input from the imaging element 22 to the sharpening processing unit 41 (image processing device 40). The optical imaging conditions indicate the information of the optical system 16 when the target image is captured and include at least the information of the focal length when the target image is captured.

The sharpening processing unit 41 performs a sharpening process for the target image according to the optical imaging conditions. In particular, the sharpening processing unit 41 according to this example performs, as the sharpening process, a restoration process based on the optical transfer function of the optical system 16 in a case in which the condition represented by the following Expression 1 is satisfied. In the following Expression 1, F indicates the focal length of the optical system 16 when the target image is captured, Fw indicates the focal length of the optical system 16 at the wide-angle end, and Ft indicates the focal length of the optical system 16 at the telephoto end.

$$F \geq \sqrt{(Fw \times Ft)}$$  Expression 1

Figure 4:
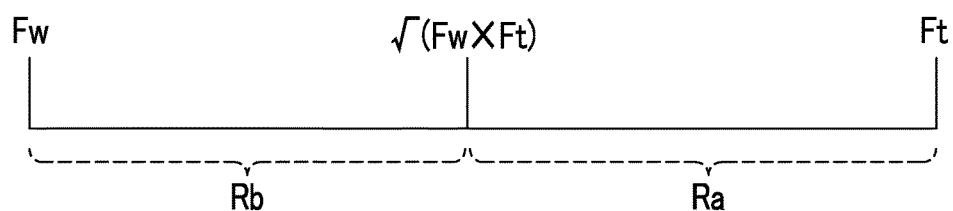
FIG. 4 is a conceptual diagram illustrating the range of the focal length of an optical system.

FIG. 4 is a conceptual diagram illustrating the range of the focal length of the optical system 16. In FIG. 4, the range of $Ft \geq F \geq \sqrt{(Fw \times Ft)}$ is represented by "Ra" and the range of $\sqrt{(Fw \times Ft)} > F \geq Fw$ is represented by "Rb". In a case in which the focal length F of the optical system 16 is variable between the focal length Fw at the wide-angle end and the focal length Ft at the telephoto end, the range of the focal length F represented by the above-mentioned Expression 1 corresponds to the range of the focal length on the telephoto side represented by "Ra" in FIG. 4. Therefore, in a case in which "the focal length F when the target image is captured" is equal to or greater than "the square root of the product of the focal length Fw of the optical system 16 at the wide-angle end and the focal length Ft of the optical system 16 at the telephoto end" and is included in the range "Ra" illustrated in FIG. 4, the sharpening processing unit 41 applies the restoration process based on the optical transfer function of the optical system 16 as the sharpening process to the target image.

The method of acquiring the target image and the data for the optical imaging conditions in the sharpening processing unit 41 is not particularly limited. The target image and the data for the optical imaging conditions can be input from each unit forming the surveillance camera system 20 to the sharpening processing unit 41. For example, in a case in which the image processing device 40 is provided in the camera-side control processing unit 23 of the camera device 10, the image processing device 40 may acquire an image output from the imaging element 22 as the target image and acquire the optical imaging conditions from the data used by the camera-side control processing unit 23 to control the optical system 16 and the imaging element 22. In contrast, in a case in which the image processing device 40 is provided in the terminal-side control processing unit 32 of the control terminal 30, the image processing device 40 may acquire the target image from the imaging element 22 through the camera-side control processing unit 23, the camera-side communication unit 24, and the terminal-side communication unit 33 and acquire the optical imaging conditions from "the data used to control the optical system 16 and the imaging element 22" which is held by the camera-side control processing unit 23 or the terminal-side control processing unit 32.

In a case in which meta data is added to target image data according to a format, such as an exchangeable image file format (Exif), the image processing device 40 may read the meta data added to the target image data and acquire the optical imaging conditions.

In case in which the surveillance camera system 20 (the camera-side control processing unit 23 and/or the terminal-side control processing unit 32) includes the image processing device 40 illustrated in FIG. 3, the optical system 16 satisfies all of the following conditions 1 to 3 (first imaging condition).

(Condition 1)

The optical system 16 has a variable focal length.

(Condition 2)

The entire angle of view of the optical system 16 at the wide-angle end is greater than 90 degrees.

(Condition 3)

A spatial frequency at which the value of the MTF acquired using an evaluation wavelength including a wavelength component of 435.83 nm, a wavelength component of 546.07 nm, and a wavelength component of 656.27 nm in a region of an image formation plane of the optical system 16 in which the distance from the center of the image formation plane is equal to or greater than 80% and less than 95% of half of the length of a diagonal line of an imaging surface of the imaging element 22 that outputs the target image is equal to or less than 30% is higher at the wide-angle end than at the telephoto end of the optical system 16.

The condition 1 means that the optical system 16 includes a zoom lens and it is possible to change the focal length of the optical system 16 between the "wide-angle end" indicating the shortest focal length and the "telephoto end" indicating the longest focal length. A detailed method for adjusting the focal length of the optical system 16 is not particularly limited. For example, the user may manually determine the focal length (zoom level), using the user interface 31 of the control terminal 30, or the camera-side control processing unit 23 and/or the terminal-side control processing unit 32 may automatically determine the focal length.

The condition 2 means that the entire angle of view of the optical system 16 is greater than 90 degrees at the wide-angle end indicating the longest focal length of optical system 16. For example, in a case in which the surveillance camera system is assumed for indoor surveillance, a minimum angle of view of 90 degrees is needed in order to surveil the entire room from the corner of the room without making a blind spot. Therefore, for example, in a case in which the surveillance camera system is assumed for surveillance, preferably, the focal length of the optical system 16 can be adjusted such that the entire angle of view of the optical system 16 is greater than 90 degrees.

Even in a case in which the imaging device is installed at the corner of the room, the apex of the optical system 16 is disposed at a position that is slightly closer to the inside of the room than the corner of the room, considering the size of the imaging device. Therefore, preferably, the focal length of the optical system 16 can be adjusted such that the entire angle of view of the optical system 16 is an angle of view (for example, about 100 degrees) that is greater than 90 degrees. In addition, it is preferable that the entire angle of view of the optical system 16 is greater than 100 degrees in order to improve flexibility in the arrangement of the imaging device. Therefore, the entire angle of view of the optical system 16 is preferably greater than 100 degrees, more preferably greater than 110 degrees, and most preferably greater than 120 degrees.

The condition 3 indicates that "a spatial frequency at which the value of the MTF" acquired using an "evaluation wavelength" in an "evaluation region" of the optical system 16 is "equal to or less than 30%" at the "wide-angle end" of the optical system 16 is higher than "a spatial frequency at which the value of the MTF" acquired using the "evaluation wavelength" in the "evaluation region" of the optical system 16 is "equal to or less than 30%" at the "telephoto end" of the optical system 16. The term "evaluation region" is determined on the basis of the imaging surface of the imaging element 22.

Figure 5:
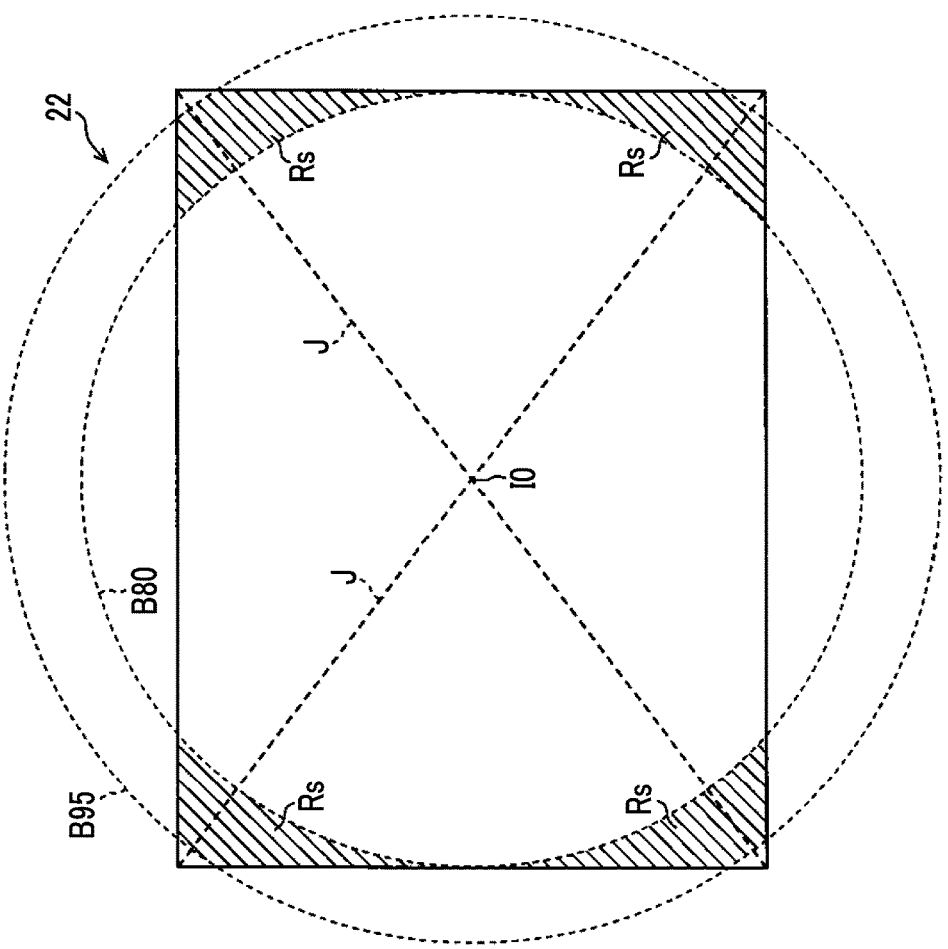
FIG. 5 is a plan view illustrating an imaging surface of an imaging element and is a diagram illustrating the range of the imaging surface used to determine an evaluation region of the optical system.

FIG. 5 is a plan view illustrating the imaging surface of the imaging element 22 and is a diagram illustrating the range of the imaging surface used to determine the evaluation region of the optical system 16. In the imaging surface of the rectangular imaging element 22, half of the length of a diagonal line J corresponds to the distance from an imaging surface center Io indicated by an intersection point between the diagonal lines J to the vertex of the imaging surface. In FIG. 5, the position where the distance from the imaging surface center Io corresponds to "80% of half of the length of the diagonal line J" is represented by "B80 (80% image height line)". In addition, in FIG. 5, the position where the distance from the imaging surface center Io corresponds to "95% of half of the length of the diagonal line J" is represented by "B95 (95% image height line)". Furthermore, in FIG. 5, the range surrounded by the 80% image height line B80 and the 95% image height line B95 is represented as a "reference range Rs".

The condition 3 indicates that the spatial frequency at which the value of the MTF acquired using the evaluation wavelength in a region of the image formation plane of the optical system 16 in which the distance from the center of the image formation plane corresponds to "a distance from the imaging surface center Io to the reference range Rs illustrated in FIG. 5" is equal to or less than 30% is higher at the wide-angle end than at the telephoto end of the optical system 16.

The image processing device 40 illustrated in FIG. 3 is suitable in a case in which the optical system 16 and the imaging element 22 are integrally provided and a specific optical system 16 satisfying the first to third conditions (first imaging condition) is regularly used to capture images. However, the optical system 16 may be interchangeable.

Figure 6:
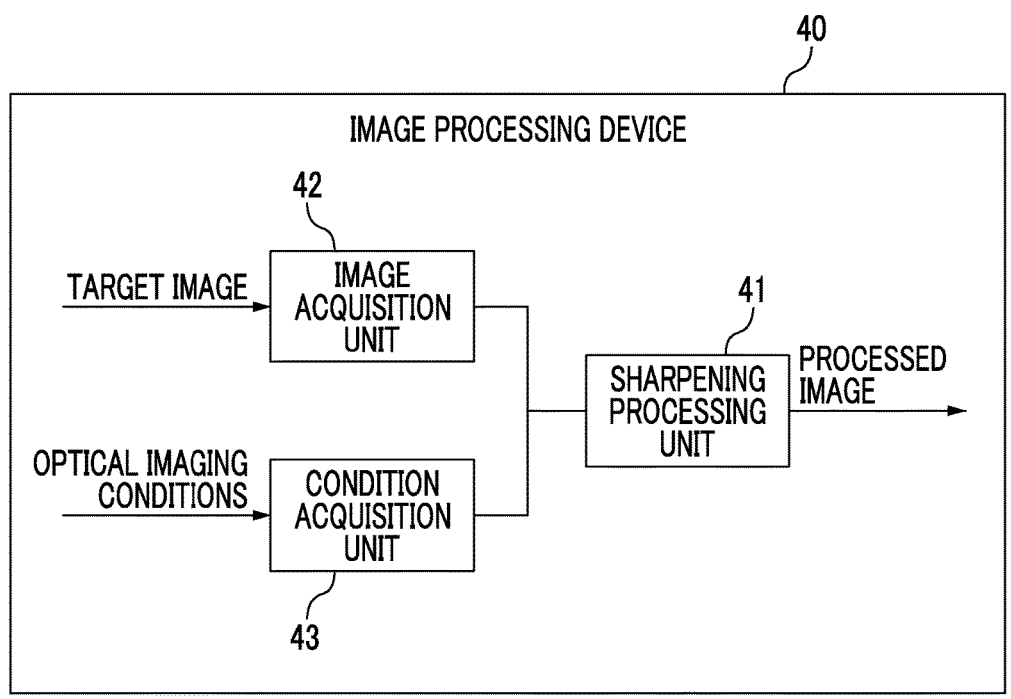
FIG. 6 is a block diagram illustrating another example of the functional configuration of the image processing device.

FIG. 6 is a block diagram illustrating another example of the functional configuration of the image processing device 40. In this example, the image processing device 40 includes an image acquisition unit 42 that acquires a target image and a condition acquisition unit 43 that acquires optical imaging conditions indicating the information of the optical system when the target image is captured, in addition to the sharpening processing unit 41.

In a case in which the optical imaging conditions acquired by the condition acquisition unit 43 satisfy the conditions 1 to 3 (first imaging condition) and condition 4 (second imaging condition) represented by the above-mentioned Expression 1, the sharpening processing unit 41 according to this example performs the restoration process based on the optical transfer function of the optical system 16 as the sharpening process for the target image acquired by the image acquisition unit 42. In the image processing device 40 according to this example, the sharpening processing unit 41 determines whether the conditions 1 to 3 (first imaging condition) and the condition 4 (second imaging condition) represented by the above-mentioned Expression 1 are satisfied and performs the restoration process as the sharpening process on the basis of the determination result. Therefore, even in a case in which the optical system 16 is interchangeable and the optical system 16 used for imaging is changed, the image processing device 40 illustrated in FIG. 6 is appropriately used.

The object to which the image processing device 40 (see FIG. 3 and FIG. 6) is applied is not limited to the surveillance camera system 20. The image processing device 40 may be applied to other apparatuses, such as a digital camera in which the optical system 16 and the imaging element 22 are integrally provided, a digital camera in which the optical system 16 is detachably mounted on a main body unit provided with the imaging element 22, and a computer that can perform image processing.

Figure 7:
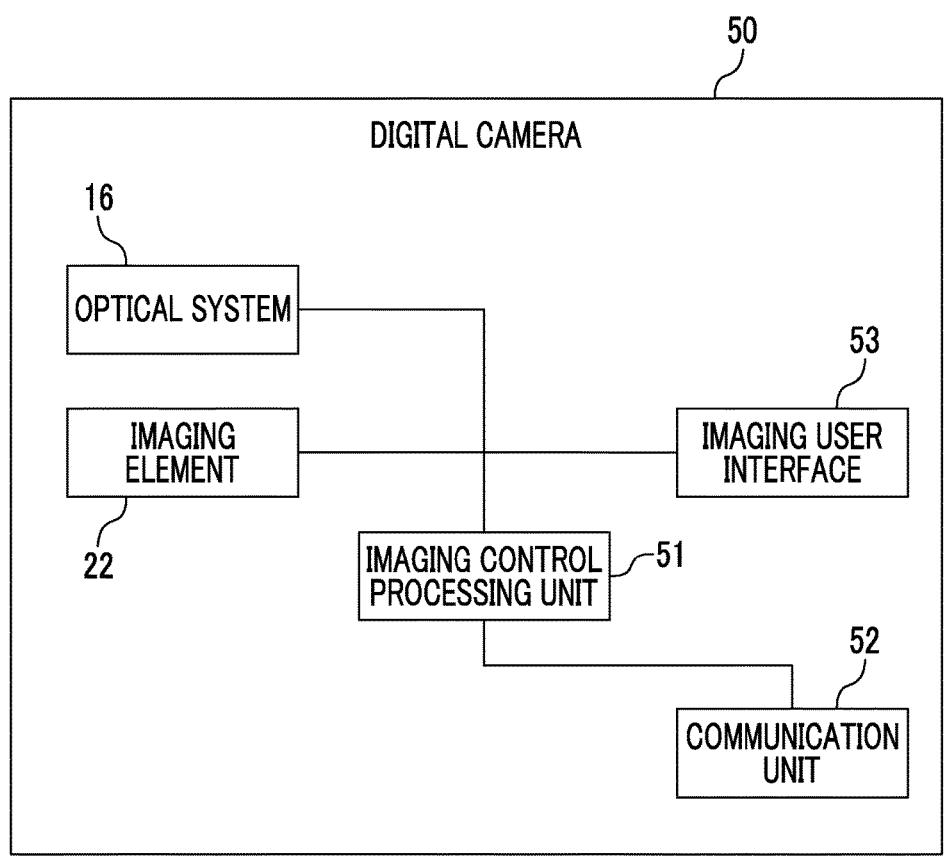
FIG. 7 is a block diagram illustrating another example of the functional configuration of the imaging device and particularly illustrates an example of the functional configuration suitable for a digital camera such as a compact digital camera in which an optical system and an imaging element are integrally provided.

FIG. 7 is a block diagram illustrating another example of the functional configuration of the imaging device and particularly illustrates an example of the functional configuration suitable for a digital camera 50 such as a compact digital camera in which the optical system 16 and the imaging element 22 are integrally provided. In this example, the digital camera 50 includes the optical system 16, the imaging element 22, an imaging control processing unit 51, a communication unit 52, and an imaging user interface 53 which are integrally provided. The imaging control processing unit 51 controls the overall operation of the optical system 16, the imaging element 22, the communication unit 52, and the imaging user interface 53. The imaging control processing unit 51 controls the optical system 16 and the imaging element 22 in response to various kinds of data and various commands input by the user through the imaging user interface 53 such that imaging is performed. The imaging control processing unit 51 can perform various processes for an image output from the imaging element 22 as the target image and can transmit the images before and after the processes to an external apparatus through the communication unit 52.

Therefore, the image processing device 40 (particularly, see FIG. 3) may be provided in the imaging control processing unit 51 of the digital camera 50 illustrated in FIG. 7. The imaging control processing unit 51 (image processing device 40) can perform the restoration process based on the optical transfer function of the optical system 16 as the sharpening process in a case in which the conditions 1 to 3 (first imaging condition) and the condition 4 (second imaging condition) represented by the above-mentioned Expression 1 are satisfied.

Figure 8:
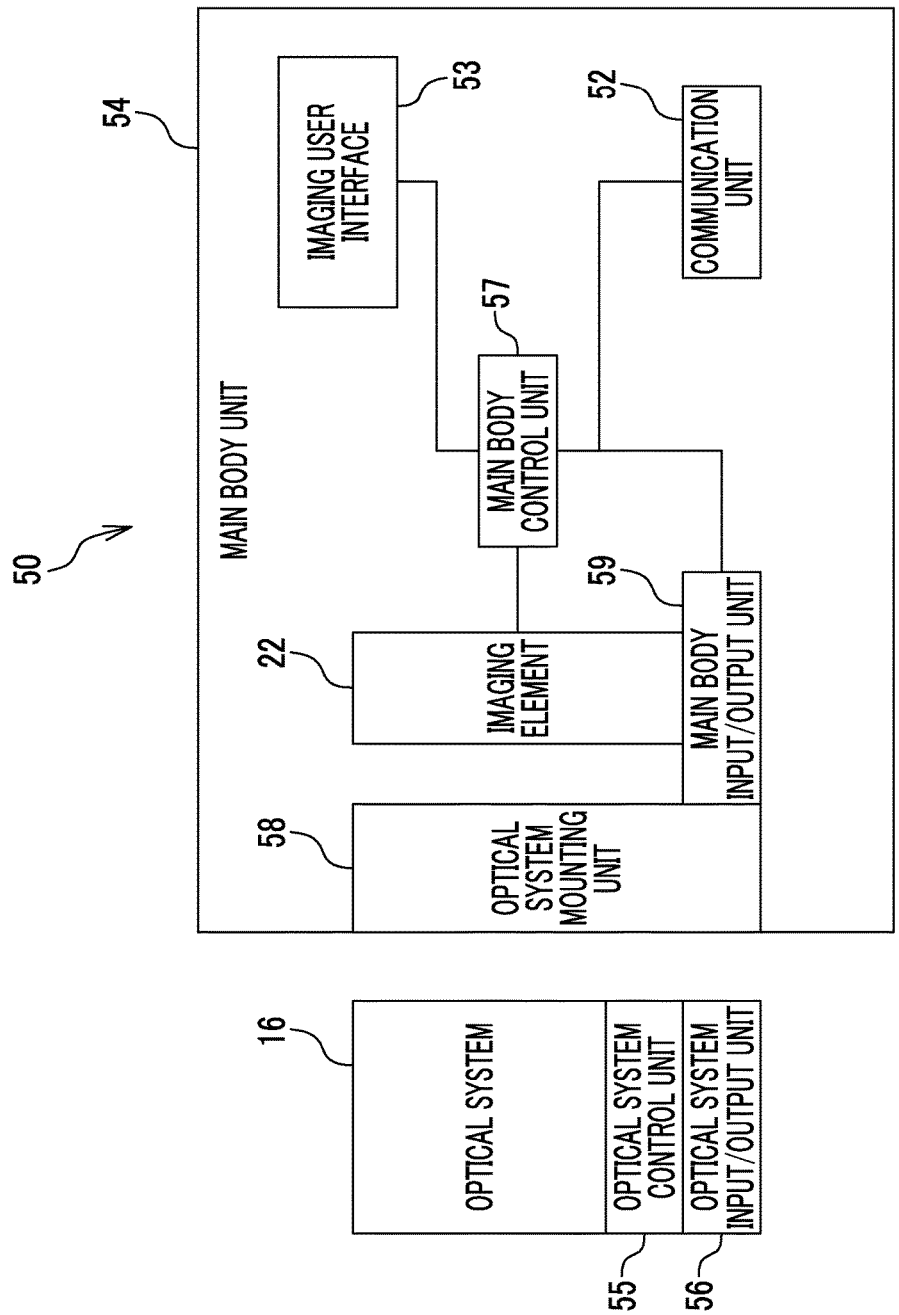
FIG. 8 is a block diagram illustrating still another example of the functional configuration of the imaging device and particularly illustrates an example of the functional configuration suitable for a digital camera such as an interchangeable lens camera in which an optical system is detachably mounted on a main body unit.

FIG. 8 is a block diagram illustrating another example of the functional configuration of the imaging device and particularly illustrates an example of the functional configuration suitable for a digital camera 50 such as an interchangeable lens camera in which the optical system 16 is detachably mounted on a main body unit 54. The digital camera 50 according to this example includes the optical system 16 and the main body unit 54. The optical system 16 includes an optical system control unit 55 and an optical system input/output unit 56 which are integrally provided and is fitted to an optical system mounting unit 58 of the main body unit 54 to be mounted on the main body unit 54. The main body unit 54 includes the imaging element 22, the optical system mounting unit 58, a main body control unit 57, a main body input/output unit 59, the communication unit 52, and the imaging user interface 53. The optical system 16 is detachably attached to the optical system mounting unit 58 and the imaging element 22 receives imaging light through the optical system 16 mounted on the optical system mounting unit 58 and outputs an image. The main body input/output unit 59 can be connected to the optical system input/output unit 56 when the optical system 16 is fitted to the optical system mounting unit 58 and can transmit and receive data. The optical system control unit 55 and the main body control unit 57 can transmit and receive data through the optical system input/output unit 56 and the main body input/output unit 59.

The main body control unit 57 transmits a control signal to the optical system control unit 55 in response to various kinds of data and various commands input by the user through the imaging user interface 53 and the optical system control unit 55 controls the optical system 16 on the basis of the control signal. The main body control unit 57 can control the imaging element 22 such that imaging is performed. The main body control unit 57 can perform various processes, using an image output from the imaging element 22 as the target image, and can transmit the images before and after the processes to external apparatuses through the communication unit 52.

Therefore, the image processing device 40 (particularly, see FIG. 6) may be provided in the main body control unit 57 of the digital camera 50 illustrated in FIG. 8. The main body control unit 57 (image processing device 40) can perform the restoration process based on the optical transfer function of the optical system 16 as the sharpening process in a case in which the conditions 1 to 3 (first imaging condition) and the condition 4 (second imaging condition) represented by the above-mentioned Expression 1 are satisfied.

Figure 9:
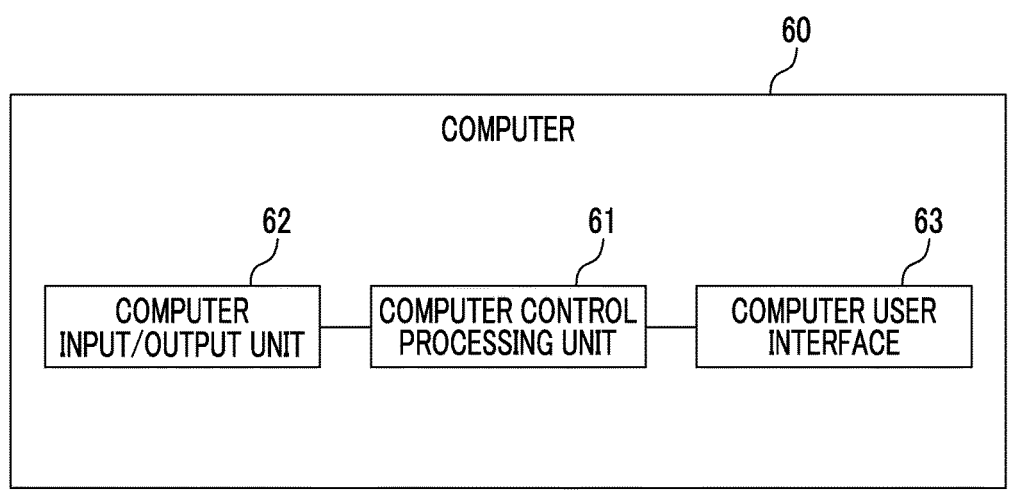
FIG. 9 is a block diagram illustrating an example of the functional configuration of a computer and particularly illustrates an example of the functional configuration to which the image processing device (particularly, see FIG. 6) can be applied.

FIG. 9 is a block diagram illustrating an example of the functional configuration of a computer 60 and particularly illustrates an example of the functional configuration to which the image processing device 40 (particularly, see FIG. 6) can be applied. The computer 60 according to this example includes a computer control processing unit 61, a computer input/output unit 62, and a computer user interface 63. The computer input/output unit 62 is connected to an external apparatus, such as the digital camera 50, and transmits and receives data to and from the external apparatus. The computer user interface 63 includes an operation unit including a pointing device, such as a mouse, and a keyboard that can be directly operated by the user and a display unit that can present various kinds of information to the user. The computer control processing unit 61 is connected to the computer input/output unit 62 and the computer user interface 63, receives data, such as image data, through the computer input/output unit 62, and performs various processes in response to various kinds of data and various commands input by the user through the computer user interface 63.

Therefore, the image processing device 40 (particularly, see FIG. 6) may be provided in the computer control processing unit 61 of the computer 60 illustrated in FIG. 9. The computer control processing unit 61 (image processing device 40) can perform the restoration process based on the optical transfer function of the optical system 16 as the sharpening process in a case in which the conditions 1 to 3 (first imaging condition) and the condition 4 (second imaging condition) represented by the above-mentioned Expression 1 are satisfied.

According to the imaging device (the surveillance camera system 20 and the digital camera 50) including the image processing device 40, in a case in which a wide-angle image is captured, it is possible to provide a captured image that has high quality in a peripheral portion in addition to a central portion. In particular, in this embodiment, the optical system 16 is designed and the restoration process is optimized, considering the characteristic of the zoom lens that a change in the optical performance and aberration with a change in the zoom magnification is relatively large on the "wide-angle side and the change in the optical performance and aberration is gradually reduced toward the telephoto side. That is, defects that occur in an image captured at the focal length on the telephoto side are removed by the restoration process based on the optical transfer function while the optical performance of the optical system 16 on the telephoto side is sacrificed for the improvement of the optical performance on the wide-angle side. Therefore, it is possible to provide a captured image having high quality in the entire zoom range.

The "restoration process based on the optical transfer function" means an image restoration process derived from the optical transfer function (OTF) obtained by performing two-dimensional Fourier transform for a point spread function (PSF) of the optical system 16 and is also referred to as a point image restoration process. The "restoration process based on the optical transfer function" may be a process using a filter created on the basis of the OTF, a process using a filter created on the basis of an MTF which is an absolute value component of the OTF and/or a phase transfer function (PTF) indicating phase shifting, or a process using a filter created on the basis of the PSF. The concept of the "optical transfer function" which will be described below includes the MTF, the PTF, and the PSF in addition to the OTF.

The restoration process based on the optical transfer function is a process which corrects the image degraded according to the optical transfer function of the optical system 16, using a restoration filter (inverse filter) directly or indirectly calculated from the optical transfer function, to cancel the degradation of the image and restores the degraded image to the original image. As the restoration process using a simple restoration filter, for example, a process is considered which applies a restoration filter with a gain that multiplies an image component by 100 to a degraded image component obtained by attenuating the original image component at a rate of 1/100 to restore the degraded image to the original image. However, in a case in which the gain calculated from the reciprocal of an attenuation characteristic is simply applied to a degraded image component, a noise component caused by an imaging system, such as the imaging element 22, is amplified. Therefore, in a case in which a restoration filter with a high amplification factor is applied to an image including a noise component, image degradation that is not negligible occurs in the image after the restoration process.

A Wiener filter has been used in various fields as the restoration filter which is created considering noise caused by the imaging system. According to a restoration process using the Wiener filter, in a case in which the amount of attenuation of the frequency characteristics of an image is significantly more than the amount of noise caused by the imaging system due to the excessive influence of blurring caused by the optical transfer function of the optical system 16, the application of high gain to the image is avoided and the attenuated gain for preferentially reducing the amount of noise caused by the imaging system is applied to the image.

The Wiener filter can also be effectively used in the imaging device according to this embodiment. In a case in which the optical system 16 is designed on the premise of applying the restoration process using the Wiener filter, instead of allowing the degradation of some of the optical performances, it is possible to improve other performances. In particular, for the optical system 16 used for surveillance imaging, it is preferable to allocate extra resources caused by the allowance of the degradation of some of the optical performances to the improvement of the limiting frequency of the wide-angle side of the optical system 16.

Next, a specific example of the optimum design of the optical system 16 on the premise of performing the restoration process based on the optical transfer function will be described.

<Optimum Design of Optical System on the Premise of Performing Restoration Process>

The Wiener filter is a filter that is created in order to minimize the mean square error between a restored image and the original image in a case in which the degradation of image quality is linear and has been known and is used as one of the standards for the design of a linear filter. The frequency characteristic F(f, h) of the Wiener filter is represented by the following Expression 2.

$$F(f, h) = \frac{H^*(f, h)S(f)}{\|H(f, h)\|^2 S(f) + N(f)} \quad \text{Expression 2}$$

$f = (f_x, f_y)$: a two-dimensional spatial frequency of a captured image h: the image height of the captured image H(f, h): the optical transfer function (OTF) of the optical system S(f): the mean square value of the amount of signal of the captured image expected in an assumed imaging condition N(f): the mean square value of the amount of noise of the optical system expected in an assumed imaging condition H*(f, h): the complex conjugate of H(f, h)

In the above-mentioned Expression 2, H(f, h) is a parameter which is obtained on the basis of the design information of the optical system and S(f) and N(f) are parameters which are obtained on the basis of the assumed imaging system.

The response X(f, h) of a restored image in a case in which the Wiener filter defined by the above-mentioned Expression 2 is applied to the captured image is represented by the following Expression 3.

$$X(f, h) = F(f, h)H(f, h) = \frac{\|H(f, h)\|^2 S(f)}{\|H(f, h)\|^2 S(f) + N(f)} \quad \text{Expression 3}$$

Here, tor the design of the optical system 16, a case in which the performance requirements represented by the following Expression 4 are satisfied is assumed.

$$\|H(f,h)\| \geq \theta_M \quad \text{Expression 4}$$

$\theta_M$: a necessary minimum value of the MTF

In a case in which the optical system 16 is designed on the premise of performing the restoration process based on the optical transfer function, it is possible to evaluate the performance requirements on the basis of the value of the MTF after the restoration process. Standards for the performance requirements are substantially lowered as represented by the following Expression 5.

$$\|X(f,h)\| \geq \theta_M \quad \text{Expression 5}$$

The following Expressions 6 and 7 related to the optical transfer function of the optical system 16 are derived from Expression 5.

$$\|H(f, h)\| \geq \theta_L \quad \text{Expression 6}$$

$$\theta_L = \sqrt{\frac{\theta_M N(f)}{(1-\theta_M)S(f)}} \quad \text{Expression 7}$$

"$\theta_L$" satisfies "$\theta_L \leq \theta_M$" in the range in which the following Expression 8 is established. Therefore, the relaxation of the condition of the MTF of the optical system 16 is allowed. In a case in which the signal-noise ratio (SN ratio) is higher than a certain level, this condition is satisfied for most values of $\theta_M$ except the values in the vicinity of 0% and 100%.

$$\theta_M(1-\theta_M) \geq \frac{N(f)}{S(f)} \quad \text{Expression 8}$$

<Optimum Design of Optical System in which Importance is Attached to Resolution at Wide-Angle End>

A case in which the resolution performance represented by the following Expressions 9 and 10 is required as the optical characteristics of the optical system 16 at the telephoto end and the wide-angle end is considered.

$$\|H_T(f_T, h)\| \geq \theta_M \quad \text{Expression 9}$$

$$\|H_W(f_W, h)\| \geq \theta_M \quad \text{Expression 10}$$

$H_T(f_T, h)$: an optical transfer function at the telephoto end of the optical system $H_W(f_W, h)$: an optical transfer function at the wide-angle end of the optical system $f_T$: a two-dimensional spatial frequency of a captured image at the telephoto end of the optical system $f_W$: a two-dimensional spatial frequency of a captured image at the wide-angle end of the optical system Assuming that the restoration process based on the optical transfer function is performed, the conditions represented by the above-mentioned Expressions 9 and 10 can be relaxed to conditions represented by the following Expressions 11 and 12.

$$\|H_T(f_T, h)\| \geq \theta_L \quad \text{Expression 11}$$

$$\|H_W(f_W, h)\| \geq \theta_L \quad \text{Expression 12}$$

Resources generated in a case in which the conditions are relaxed as described above and a threshold value is reduced are allocated to improve the limiting resolution performance of the optical system 16 at the wide-angle end. Then, the following Expression 13 can be established.

$$\|H_W(f'_W, h)\| \geq \theta_M \quad \text{Expression 13}$$

$f'_W$: an improved limiting resolution frequency (where "$f'_W > f_W$")

Since it is assumed that the restoration process based on the optical transfer function of the optical system 16 is performed, it is possible to design the optical system 16 of which the limiting resolution performance at the wide-angle end is improved as described above.

Next, a specific example of the configuration of the optical system 16 will be described.

Example 1

Figure 10A:
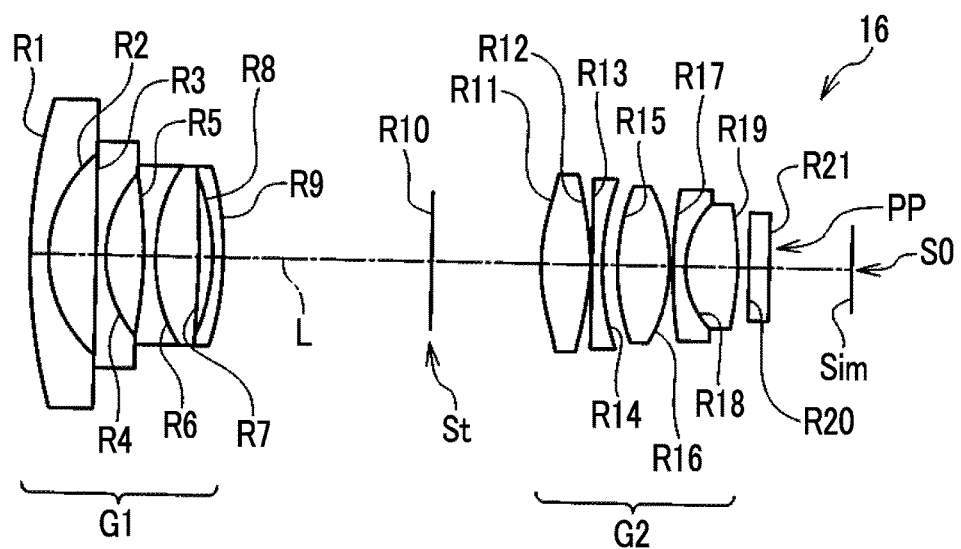
FIGS. 10A and 10B are cross-sectional views illustrating an optical system according to Example 1.
Figure 10B:
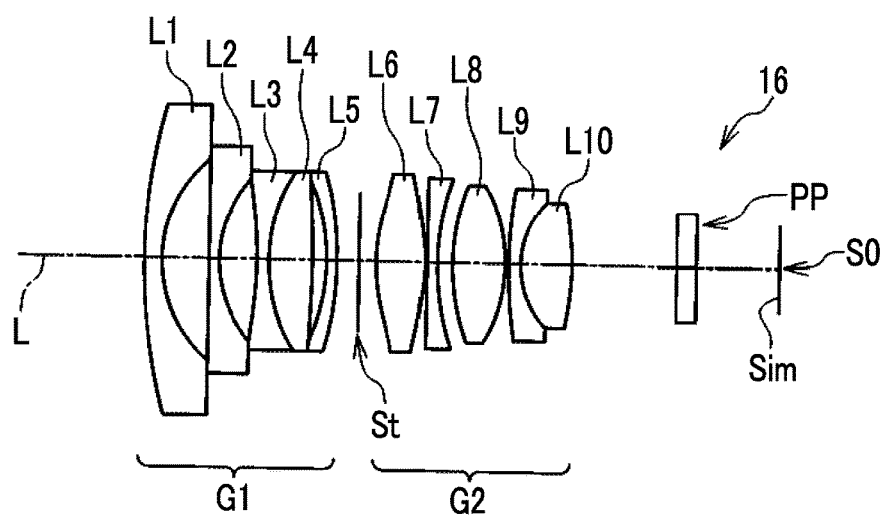

FIGS. 10A and 10B are cross-sectional views illustrating an optical system 16 according to Example 1. FIG. 10A illustrates the arrangement of the optical system 16 at the wide-angle end and FIG. 10B illustrates the arrangement of the optical system 16 at the telephoto end. Each of FIGS. 10A and 10B illustrates the arrangement of the optical system 16 in a state in which the optical system is focused on an infinite object. In FIGS. 10A and 10B, the left side is an object side (subject side) and the right side is an image side (the side of an image surface Sim).

The optical system 16 according to this example includes "a first lens group G1 with negative focal power", a "stop St", "a second lens group G2 with positive focal power", and a "parallel-plate-shaped optical member PP" which are arranged in this order from the object side. The first lens group G1 includes a first lens L1, a second lens L2, a third lens L3, a fourth lens L4, and a fifth lens L5 (see FIG. 10B). The second lens group G2 includes a sixth lens L6, a seventh lens L7, an eighth lens L8, a ninth lens L9, and a tenth lens L10 (see FIG. 10B).

In a case in which the optical system 16 is mounted on the imaging device, it is preferable that optical members typified by a cover glass for protecting the imaging surface of the imaging element 22, a prism, such as a color separation prism corresponding to the specifications of the imaging device, and various filters, such as a low-pass filter or an infrared cut filter, are provided. In the example illustrated in FIGS. 10A and 10B, the parallel-plate-shaped optical member PP assumed as these optical members is provided between the second lens group G2 and the image surface Sim.

In the optical system 16 according to this example, the stop St is provided between the first lens group G1 and the second lens group G2 and the position of the stop St and the image surface Sim during a magnification change operation of changing the focal length is fixed. In addition, the image surface Sim indicates the image formation plane of the optical system 16 and the imaging surface of the imaging element 22 is disposed at the position of the image surface Sim during imaging. The stop St illustrated in FIGS. 10A and 10B does not indicate a size or a shape and indicates a position on an optical axis L. In FIGS. 10A and 10B, reference numeral "S0" indicates a position corresponding to the center of the image formation plane of the optical system 16.

In a case in which the focal length of the optical system 16 changes, the distance in the direction of the optical axis L between the first lens group G1 and the second lens group G2 changes. In this case, the first to fifth lenses L1 to L5 forming the first lens group G1 are integrally moved in the direction of the optical axis L while maintaining the position therebetween and the sixth to tenth lenses L6 to L10 forming the second lens group G2 are integrally moved in the direction of the optical axis L while maintaining the position therebetween. In the two-group configuration, negative power generated by the first lens group G1 and positive power generated by the second lens group G2 are arranged in this order from the object side. The configuration in which the zoom magnification is adjusted by changing the distance between the first lens group G1 and the second lens group G2 is advantageous to widen the angle of view of the optical system 16.

FIG. 11 is a table (Table 1) illustrating the basic data of the optical system 16 according to Example 1. In FIG. 11, a field "R" ("1" to "21" and "Sim") indicates an i-th (i=1, 2, 3, ..., 21) surface number (see "R1" to "R21" in FIG. 10A) that gradually increases toward the image side, with the surface of a component closest to the object side being the first surface and the image surface Sim.

In FIG. 11, a field "r" indicates the curvature radius (mm: millimeters) of each surface number. The sign of the curvature radius is positive in a case in which the surface has a shape that is convex to the object side and is negative in a case which the surface has a shape that is convex to the image side. Surface numbers "3", "20", and "21" mean that the curvature radius is infinite and the shape of the surface is a plane which is perpendicular to the optical axis L and whose normal direction is aligned with the direction of the optical axis L. In addition, a symbol "-" indicating a hyphen is written to the field of the curvature radius of the surface (surface number "10") corresponding to the stop St in FIG. 11.

In FIG. 11, a field "D" indicates a surface interval (mm) between each surface with surface number (i) and a surface with surface number (i+1) adjacent to the image side (the right side of FIGS. 10A and 10B) on the optical axis L. In FIG. 11 "variable D10 (the distance between the fifth lens L5 and the stop St)", "variable D11 (the distance between the stop St and the sixth lens L6)" and "variable D21 (the distance between the tenth lens L10 and the optical member PP)" mean that the distance changes depending on the zoom magnification (focal length) (see FIG. 12 which will be described below).

In FIG. 11, a field "Nd" indicates the refractive index of an optical element between each surface with surface number (i) and the surface with surface number (i+1) adjacent to the image side (the right side of FIGS. 10A and 10B) with respect to the d-line (a wavelength of 587.6 nm).

In FIG. 11, a field "vd" indicates the Abbe number of the optical element between each surface with surface number (i) and the surface with surface number (i+1) adjacent to the image side (the right side of FIGS. 10A and 10B) with respect to the d-line.

In FIG. 11, a field "θgF" indicates the partial dispersion ratio of the optical element between each surface with surface number (i) and the surface with surface number (i+1) adjacent to the image side (the right side of FIGS. 10A and 10B) between the g-line (a wavelength of 435.8 nm) and the F-line (486.1 nm).

In FIG. 11, blanks in the fields "Nd", "vd", and "θgF" mean that there is no corresponding optical element and the corresponding fields are empty.

FIG. 12 is a table (Table 2) illustrating the focal length, the F-number ("Fno"), and the entire angle of view ("2ω") of the entire optical system 16 according to Example 1 and a variable surface interval ("variable D10 (the distance between the fifth lens L5 and the stop St)", "variable D11 (the distance between the stop St and the sixth lens L6)", and "variable D21 (the distance between the tenth lens L10 and the optical member PP)") on the optical axis L in the entire optical system 16 at the wide-angle end and the telephoto end. The units of the focal length and the surface interval ("variable D10", "variable D11", and "variable D21") on the optical axis L illustrated in FIG. 12 are "millimeters (mm)" and the unit of the entire angle of view ("2ω") is "degrees (°)". However, the optical system can be proportionally magnified or reduced and then used. Therefore, other appropriate units may be used. In addition, numerical values illustrated in each table in the accompanying drawings of the specification are rounded to predetermined digits.

As illustrated in FIG. 12, the entire angle of view of the optical system 16 according to Example 1 at the wide-angle end is 151.3 degrees. Therefore, the optical system 16 satisfies the condition 2.

FIG. 13 is a table (Table 3) illustrating the aspheric coefficients ("KA" and "Ai (i=3 to 20)") of the aspheric lenses (particularly, surface numbers "11 (see "R11" in FIG. 10A)" and "12 (see "R12" in FIG. 10A") of the optical system 16 according to Example 1.

For the aspheric coefficients illustrated in FIG. 13, the aspheric depth Z of surface numbers "11" and "12" is represented by the following Expression 14.

$$Z = \frac{Y^2/R}{1+(1-KA \cdot Y^2/R^2)^{1/2}} + \sum_{i=3}^{20} A_i Y^i \qquad \text{Expression 14}$$

Y: height
R: a paraxial radius of curvature
KA, Ai: an aspheric coefficient

In FIG. 13, "E" indicates an exponent. For example, "E-05" means 10 to the power of "-5" (that is, "$10^{-5}$").

Figure 14:
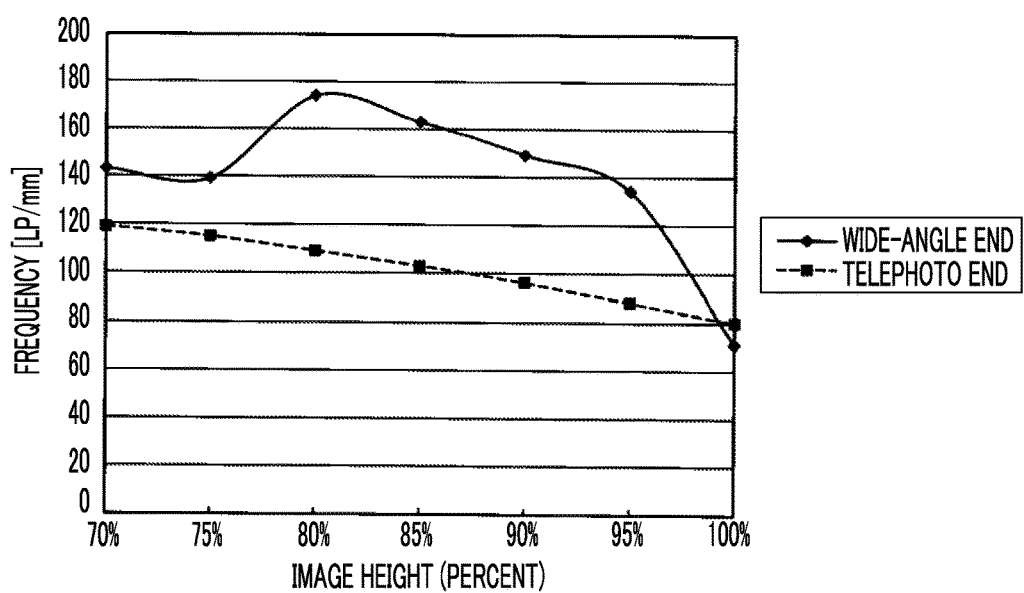
FIG. 14 is a diagram (graph 1) illustrating the relationship between a position from the optical axis of the optical system according to Example 1 and a limiting spatial frequency and illustrates an optical performance at the wide-angle end and an optical performance at the telephoto end.

FIG. 14 is a diagram (graph 1) illustrating the relationship between a position from the optical axis L of the optical system 16 according to Example 1 and a limiting spatial frequency and illustrates an optical performance at the wide-angle end and an optical performance at the telephoto end.

In FIG. 14, the horizontal axis ("image height (percent)") indicates the position from the optical axis of the optical system 16 and indicates the percentage (%) of the distance from the center of the image formation plane of the optical system 16 with respect to "half of the length of the diagonal line J of the imaging surface of the imaging element 22". For example, "70%" on the horizontal axis indicates the position of the optical system 16 where the distance from the optical axis of the optical system 16 in the diametrical direction is 70% of "half of the length of the diagonal line J of the imaging surface of the imaging element 22". Similarly, "100%" on the horizontal axis indicates the position of the optical system 16 where the distance from the optical axis of the optical system 16 in the diametrical direction is equal to "half of the length of the diagonal line J of the imaging surface of the imaging element 22".

In FIG. 14, the vertical axis ("frequency line pairs/mm [LP/mm]") indicates a spatial frequency.

In FIG. 14, the spatial frequency (limiting spatial frequency) at which the value of the MTF of the optical system 16 according to Example 1 acquired using the evaluation wavelength is 30% is plotted. The evaluation wavelength used in this example includes a wavelength component (g-line) of 435.83 nm, a wavelength component (e-line) of 546.07 nm, and a wavelength component (C-line) of 656.27 nm and is the wavelength of white light including each wavelength component at the following ratio: "a wavelength component of 435.83 nm: a wavelength component of 546.07 nm: a wavelength component of 656.27 nm=1:5:1".

The optical system 16 according to Example 1 which has the characteristics illustrated in FIGS. 10A to 14 is a variable magnification optical system with a magnification of about 2.7, is designed such that importance is attached to the optical performance at the wide-angle end, and satisfies the conditions 1 to 3 (first imaging condition). In the imaging device according to this embodiment, the restoration process based on the optical transfer function is performed as the sharpening process for an image captured on the basis of the focal length on the telephoto side (see the condition 4 (second imaging condition) represented by the above-mentioned Expression 1) among the images captured using the optical system 16 according to Example 1 which has the above-mentioned optical characteristics. Therefore, it is possible to provide an image having high quality in the entire zoom range.

Example 2

Figure 15A:
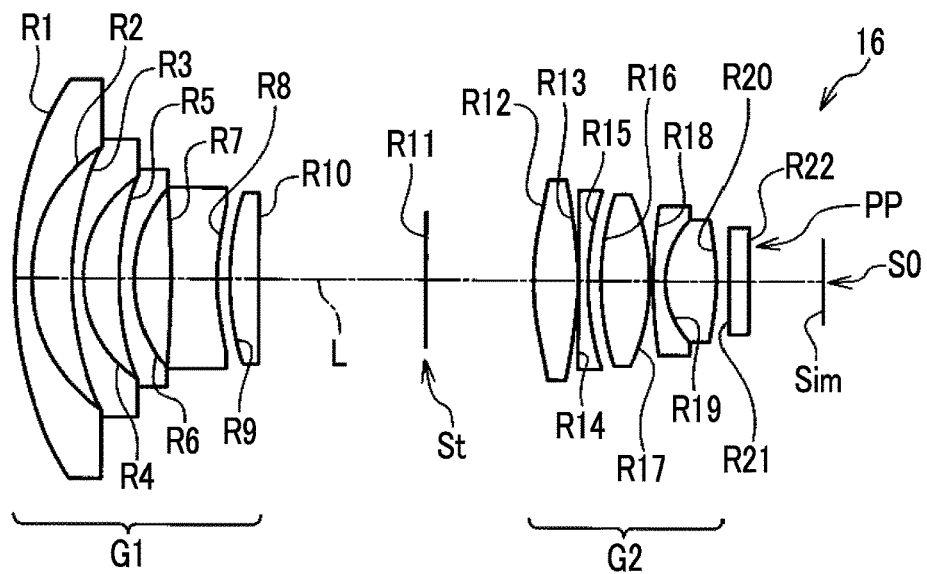
FIGS. 15A and 15B are cross-sectional views illustrating an optical system according to Example 2.
Figure 15B:
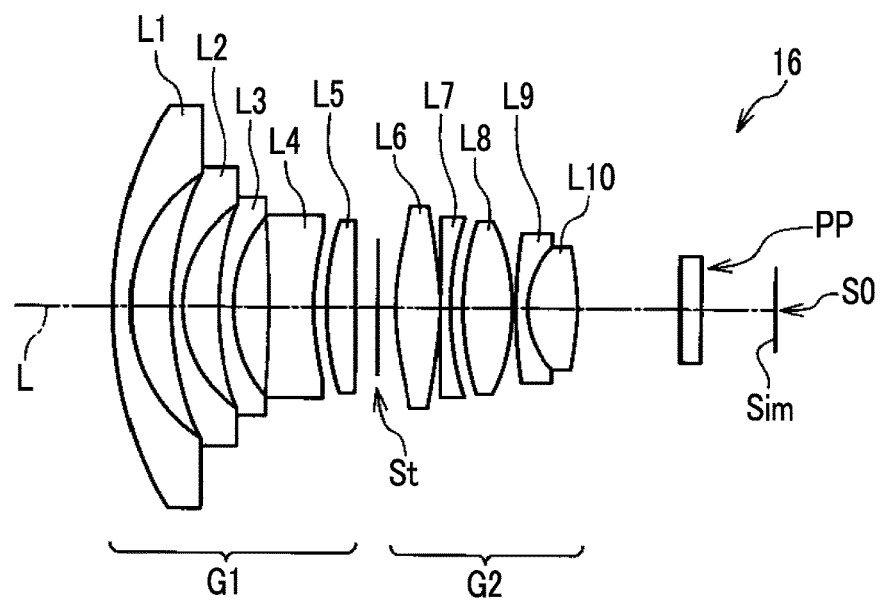

FIGS. 15A and 15B are cross-sectional views illustrating an optical system 16 according to Example 2. FIG. 15A illustrates the arrangement of the optical system 16 at the wide-angle end and FIG. 15B illustrates the arrangement of the optical system 16 at the telephoto end. Each of FIGS. 15A and 15B illustrates the arrangement of the optical system 16 in a state in which the optical system is focused on an infinite object. In FIGS. 15A and 15B, the left side is an object side (subject side) and the right side is an image side (the side of an image surface Sim).

The optical system 16 according to Example 2 enables wide-angle imaging with a larger angle of view than the optical system 16 according to Example 1 (see FIG. 17 which will be described below). The optical system 16 according to this example includes "a first lens group G1 with negative focal power", a "stop St", "a second lens group G2 with positive focal power", and a "parallel-plate-shaped optical member PP" which are arranged in this order from the object side. The first lens group G1 includes a first lens L1, a second lens L2, a third lens L3, a fourth lens L4, and a fifth lens L5. The second lens group G2 includes a sixth lens L6, a seventh lens L7, an eighth lens L8, a ninth lens L9, and a tenth lens L10. In the optical system 16 according to this example, the stop St is provided between the first lens group G1 and the second lens group G2. The optical member PP is provided between the second lens group G2 and an image surface Sim. The position of the stop St and the optical member PP is fixed even during a magnification change operation of changing the focal length.

In a case in which the focal length of the optical system 16 changes, the distance in the direction of the optical axis L between the first lens group G1 and the second lens group G2 changes. In this case, the first to fifth lenses L1 to L5 forming the first lens group G1 are integrally moved in the direction of the optical axis L while maintaining the position therebetween and the sixth to tenth lenses L6 to L10 forming the second lens group G2 are integrally moved in the direction of the optical axis L while maintaining the position therebetween.

FIG. 16 is a table (Table 4) illustrating the basic data of the optical system 16 according to Example 2. In FIG. 16, fields "R", "r", "D", "Nd", "vd" and "θgF" have the same meaning as those illustrated in FIG. 11 in Example 1 and indicate a surface number (R1 to R22 (see FIG. 15A)) and the image surface Sim, a curvature radius, a surface interval, a refractive index, an Abbe number, and a partial dispersion ratio between the g-line and the F-line, respectively.

FIG. 17 is a table (Table 5) illustrating the focal length, the F-number ("Fno"), and the entire angle of view ("2ω") of the entire optical system 16 according to Example 2 and a surface interval ("variable D10 (the distance between the fifth lens L5 and the stop St)", "variable D11 (the distance between the stop St and the sixth lens L6)", and "variable D21 (the distance between the tenth lens L10 and the optical member PP)") on the optical axis L in the entire optical system 16 at the wide-angle end and the telephoto end. In FIG. 17, fields "focal length", "Fno", "2ω", "variable D10", "variable D11", and "variable D21" are the same as those illustrated in FIG. 12 in Example 1.

As illustrated in FIG. 17, the entire angle of view of the optical system 16 according to Example 2 at the wide-angle end is 164.3 degrees. Therefore, the optical system 16 satisfies the condition 2.

FIG. 18 is a table (Table 6) illustrating the aspheric coefficients ("KA" and "Ai (i=3 to 20)") of the aspheric lenses (particularly, surface numbers "12 (see "R12" in FIG. 15A)" and "13 (see "R13" in FIG. 15A)") of the optical system 16 according to Example 2. In FIG. 18, each field is the same as that illustrated in FIG. 13 in Example 1.

Figure 19:
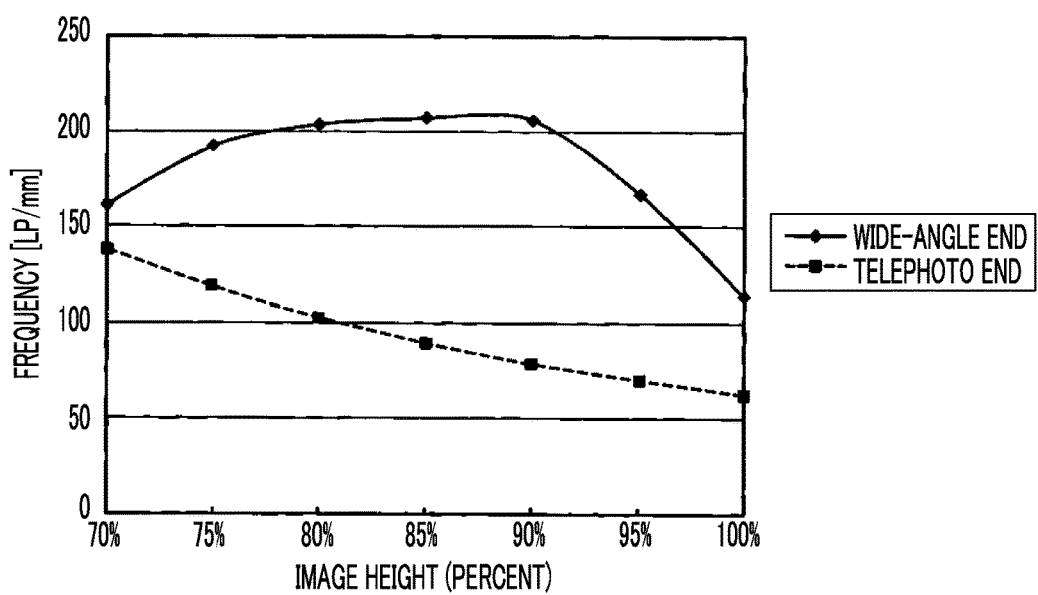
FIG. 19 is a diagram (graph 2) illustrating the relationship between a position from the optical axis of the optical system according to Example 2 and a limiting spatial frequency and illustrates an optical performance at the wide-angle end and an optical performance at the telephoto end.

FIG. 19 is a diagram (graph 2) illustrating the relationship between a position from the optical axis L of the optical system 16 according to Example 2 and a limiting spatial frequency and illustrates the optical performance at the wide-angle end and the optical performance at the telephoto end. In FIG. 19, the horizontal axis, the vertical axis, a plot, and an evaluation wavelength are the same as those illustrated in FIG. 14 in Example 1. In FIG. 19, the spatial frequency (limiting spatial frequency) at which the value of the MTF of the optical system 16 according to Example 2 acquired using the evaluation wavelength is 30% is plotted.

The optical system 16 according to Example 2 which has the characteristics illustrated in FIGS. 15A to 19 is designed such that importance is attached to the optical performance at the wide-angle end and satisfies the conditions 1 to 3 (first imaging condition). In the imaging device according to this embodiment, the restoration process based on the optical transfer function is performed as the sharpening process for an image captured on the basis of the focal length on the telephoto side (see the condition 4 (second imaging condition) represented by the above-mentioned Expression 1) among the images captured using the optical system 16 according to Example 2 which has the above-mentioned optical characteristics. Therefore, it is possible to provide an image having high quality in the entire zoom range.

Next, preferred modes related to a combination of "the optical system 16 having a high optical performance on the wide-angle side" and "the restoration process based on the optical transfer function" will be described.

<First Mode>

Figure 20:
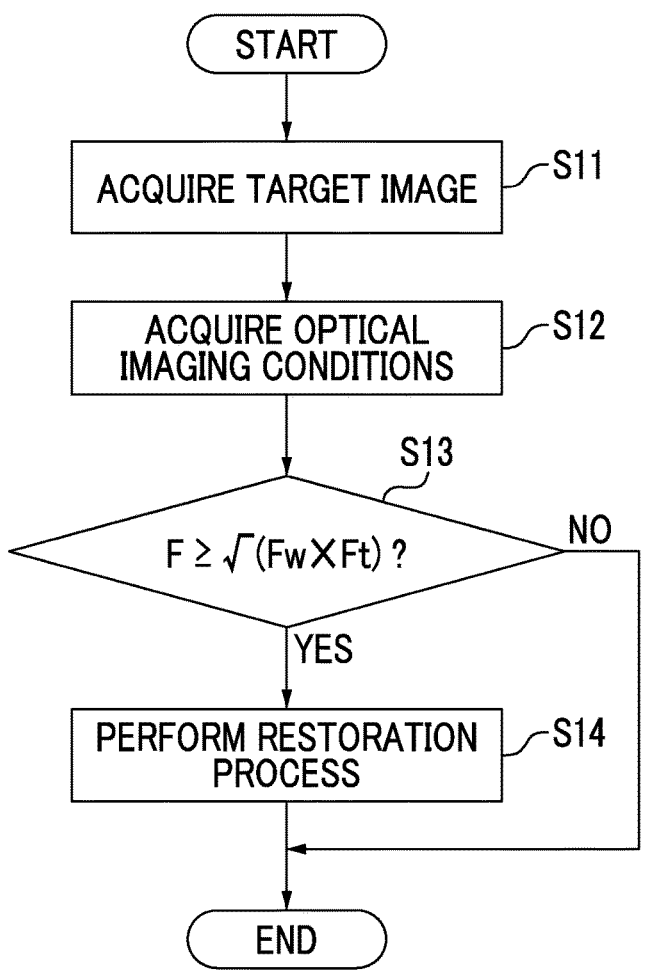
FIG. 20 is a flowchart illustrating an example of image processing according to a first mode.

FIG. 20 is a flowchart illustrating an example of image processing according to a first mode.

This mode is suitable for a case in which the optical system 16 used to capture the target image is not changed and fixed. This mode can be applied to the image processing device 40 illustrated in FIG. 3. For example, "the digital camera 50 (see FIG. 7) in which it is difficult to interchange the optical system 16" or "an imaging device, such as the surveillance camera system 20 (see FIG. 2) provided with the interchangeable optical system 16" can use the image processing according to this mode.

In this mode, it is assumed that the optical system 16 used for imaging satisfies the conditions 1 to 3 (first imaging condition), it is determined whether the focal length during imaging satisfies the condition 4 (second imaging condition) represented by the above-mentioned Expression 1, and it is determined whether to perform the restoration process on the basis of the determination result.

That is, the sharpening processing unit 41 of the image processing device 40 acquires a target image (S11 in FIG. 20), acquires optical imaging conditions (S12), and determines whether the condition 4 (second imaging condition) represented by the above-mentioned Expression 1 is satisfied on the basis of the optical imaging conditions (S13). In a case in which it is determined that the condition 4 is satisfied (YES in S13), the sharpening processing unit 41 performs "the restoration process based on the optical transfer function" for the target image (S14). On the other hand, in a case in which it is determined that the condition 4 is not satisfied (NO in S13), "the restoration process based on the optical transfer function (see S14)" is skipped. As such, in this mode, the sharpening processing unit 41 performs the restoration process only in a case in which the condition 4 "F≥√(Fw×Ft)" is satisfied.

A detailed method of the restoration process based on the optical transfer function (see S14) is not particularly limited. For example, a restoration filter may be applied to all of the pixels forming the target image to perform the restoration process for the entire target image or the restoration filter may be applied to only some of the pixels forming the target image to perform the restoration process for a portion of the target image. In addition, in a case in which the restoration process is performed for only a portion of the target image, it is preferable that the restoration process is preferentially performed for a portion in which image quality is likely to be degraded. For example, it is preferable that restoration filter is preferentially applied to the pixels forming a peripheral portion of the target image.

As described above, it is possible to acquire an image with high quality, using the good optical characteristics of the optical system 16, during imaging on the wide-angle side. In addition, the target image captured on the telephoto side where the condition 4 represented by the above-mentioned Expression 1 is satisfied is restored so as to have high quality by "the restoration process based on the optical transfer function". As such, according to this mode, it is possible to provide an image having high quality in the entire range from the wide-angle end to the telephoto end.

<Second Mode>

In this mode, the same or similar elements as those in the first mode are denoted by the same reference numerals and the detailed description thereof will not be repeated.

This mode is suitable for a case in which the optical system 16 used to capture the target image is not fixed and is interchangeable. This mode can be applied to the image processing device 40 illustrated in FIG. 6. For example, "the surveillance camera system 20 (see FIG. 2) or the digital camera 50 (see FIG. 8) provided with the interchangeable optical system 16" and "the computer 60 (see FIG. 9) that can perform image processing for images captured by a plurality of imaging devices" can use the image processing according to this mode.

Figure 21:
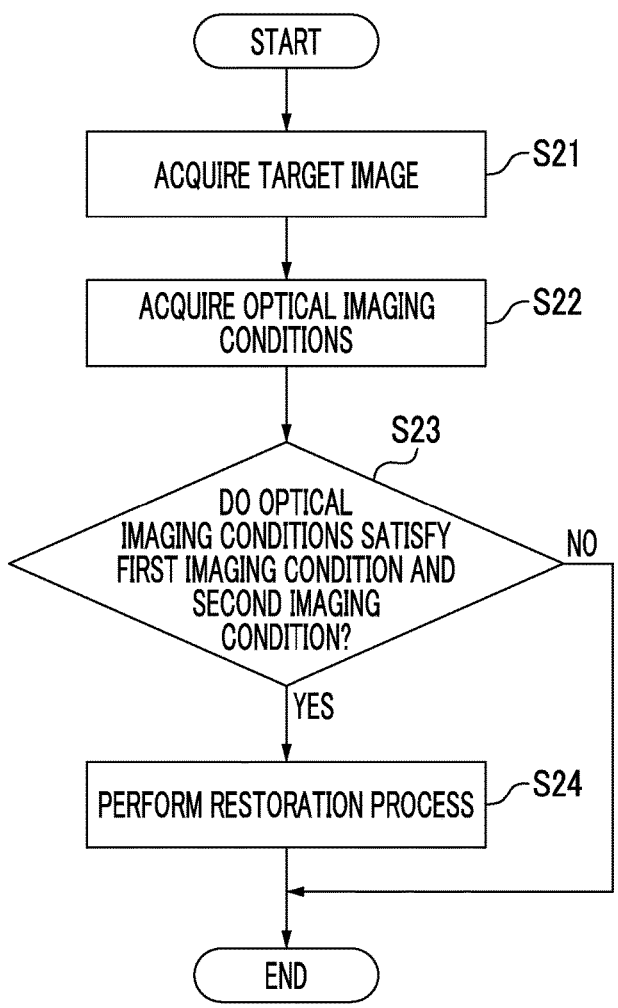
FIG. 21 is a flowchart illustrating an example of image processing according to a second mode.

FIG. 21 is a flowchart illustrating an example of the image processing according to the second mode.

In this mode, it is determined whether to perform the restoration process on the basis of "the result of the determination whether the optical system 16 used to capture a target image satisfies the conditions 1 to 3 (first imaging condition)" in addition to "the result of the determination whether the condition 4 (second imaging condition) represented by the above-mentioned Expression 1 is satisfied".

That is, in this mode, similarly to the first mode, the sharpening processing unit 41 of the image processing device 40 acquires a target image (S21 in FIG. 21) and acquires optical imaging conditions (S22).

However, in this mode, the sharpening processing unit 41 determines whether the conditions 1 to 3 (first imaging condition) and the condition 4 (second imaging condition) are satisfied on the basis of the optical imaging conditions (S23). In a case in which the optical imaging conditions satisfy all of the first imaging condition and the second imaging condition (conditions 1 to 4) (YES in S23), the sharpening processing unit 41 performs "the restoration process based on the optical transfer function" for the target image (S24). On the other hand, in a case in which it is determined that the optical imaging conditions do not satisfy at least some of the first imaging condition and the second imaging condition (conditions 1 to 4) (NO in S23), "the restoration process based on the optical transfer function (see S24)" is skipped.

As described above, according to this mode, even in a case in which the optical system 16 used to capture the target image can be changed, the optical characteristics of the optical system 16 and the restoration process based on the optical transfer function can be appropriately and complementarily combined with each other to provide an image having high quality in the entire range from the wide-angle end to the telephoto end.

<Third Mode>

In this mode, the same or similar elements as those in the second mode are denoted by the same reference numerals and the detailed description thereof will not be repeated.

Figure 22:
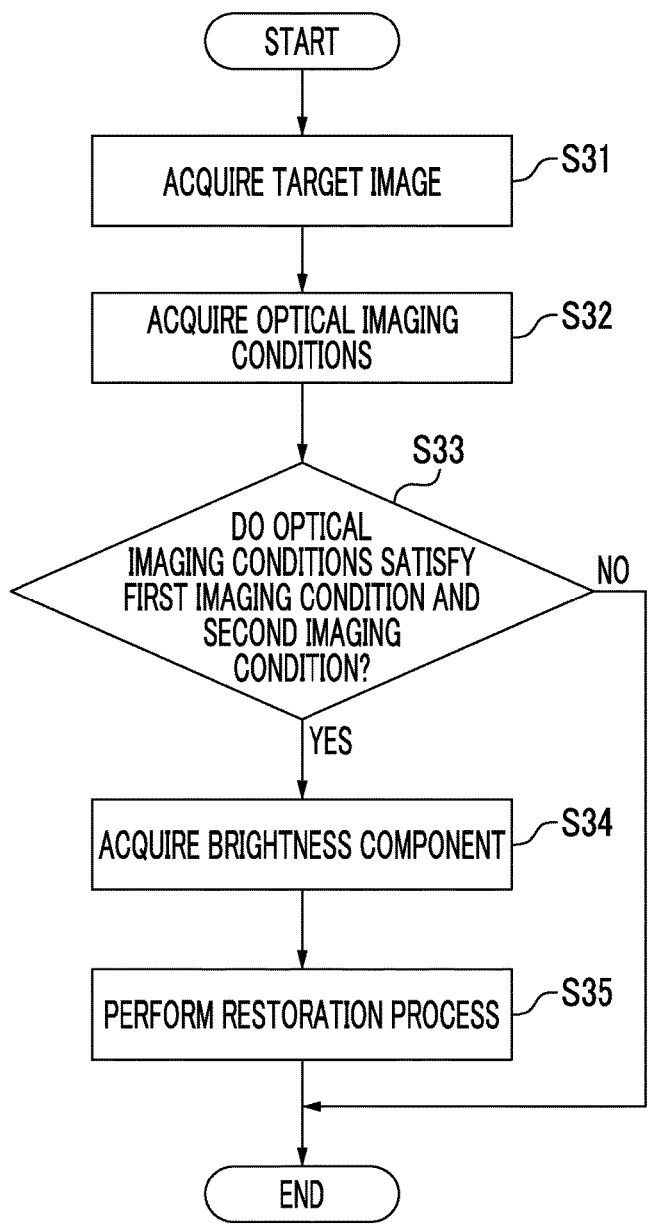
FIG. 22 is a flowchart illustrating an example of image processing according to a third mode.

FIG. 22 is a flowchart illustrating an example of the image processing according to the third mode.

In this mode, in a case in which "the restoration process based on the optical transfer function" is performed, the sharpening processing unit 41 acquires a brightness component of a target image and performs the restoration process for only the brightness component.

That is, in this mode, similarly to the second mode, the sharpening processing unit 41 of the image processing device 40 acquires a target image (S31 in FIG. 22), acquires optical imaging conditions (S32), and determines whether the conditions 1 to 4 (the first imaging condition and the second imaging condition) are satisfied on the basis of the optical imaging conditions (S33).

However, in this mode, in a case in which all of the first imaging condition and the second imaging condition (conditions 1 to 4) are satisfied (YES in S33), the sharpening processing unit 41 acquires the brightness component of the target image (S34) and performs "the restoration process based on the optical transfer function" for the acquired brightness component (S35). On the other hand, in a case in which it is determined that at least some of the first imaging condition and the second imaging condition (conditions 1 to 4) are not satisfied (NO in S33), "the process of acquiring the brightness component of the target image" and "the restoration process based on the optical transfer function" are skipped.

The time when the brightness component of the target image is acquired is not particularly limited and the brightness component of the target image may be acquired before or after Step S33. In addition, the method of acquiring the brightness component of the target image is acquired is not particularly limited. For example, in a case in which the target image is represented by red, green, and blue data (RGB data), the sharpening processing unit 41 can acquire a brightness component Y of the target image according to the following Expression 15. Each coefficient of the RGB data used in the following Expression 15 is just illustrative and other coefficients may be used.

$$Y = 0.299 \times R + 0.587 \times G + 0.114 \times B \qquad \text{Expression 15}$$

R: R data of the target image
G: G data of the target image
B: B data of the target image As described above, according to this mode, the restoration process is performed for the brightness component of the target image. Therefore, it is possible to reduce the computational load of the restoration process and to increase a processing speed while ensuring high accuracy of restoration.

<Fourth Mode>

In this mode, the same or similar elements as those in the first to third modes are denoted by the same reference numerals and the detailed description thereof will not be repeated.

In this mode, in a case in which the conditions 1 to 3 (first imaging condition) are satisfied and the condition 4 (second imaging condition) is not satisfied, the sharpening processing unit 41 performs a lateral chromatic aberration correction process as the sharpening process for the target image. That is, in a case in which the optical imaging conditions satisfy the conditions 1 to 3 (first imaging condition) and satisfy condition 5 (third imaging condition) represented by the following Expression 16, the sharpening processing unit 41 performs, as the sharpening process, "a lateral chromatic aberration correction process of adjusting the magnification of a color component forming the target image".

$$F < \sqrt{(Fw \times Ft)} \qquad \text{Expression 16}$$

The condition 5 (third imaging condition) represented by Expression 16 is correlated with the condition 4 (second imaging condition) represented by the above-mentioned Expression 1. It is possible to perform "the determination whether the condition 4 (second imaging condition) is satisfied" and "the determination whether the condition 5 (third imaging condition) is satisfied" at the same time. That is, "that the condition 4 (second imaging condition) is satisfied" is equivalent to "that the condition 5 (third imaging condition) is satisfied" and "that the condition 4 (second imaging condition) is not satisfied" is equivalent to "that the condition 5 (third imaging condition) is satisfied". Therefore, in this mode which will be described below, "only the determination whether the condition 4 (second imaging condition) is satisfied" is performed. However, in practice, "the determination whether the condition 5 (third imaging condition) is not satisfied" is also performed.

Figure 23:
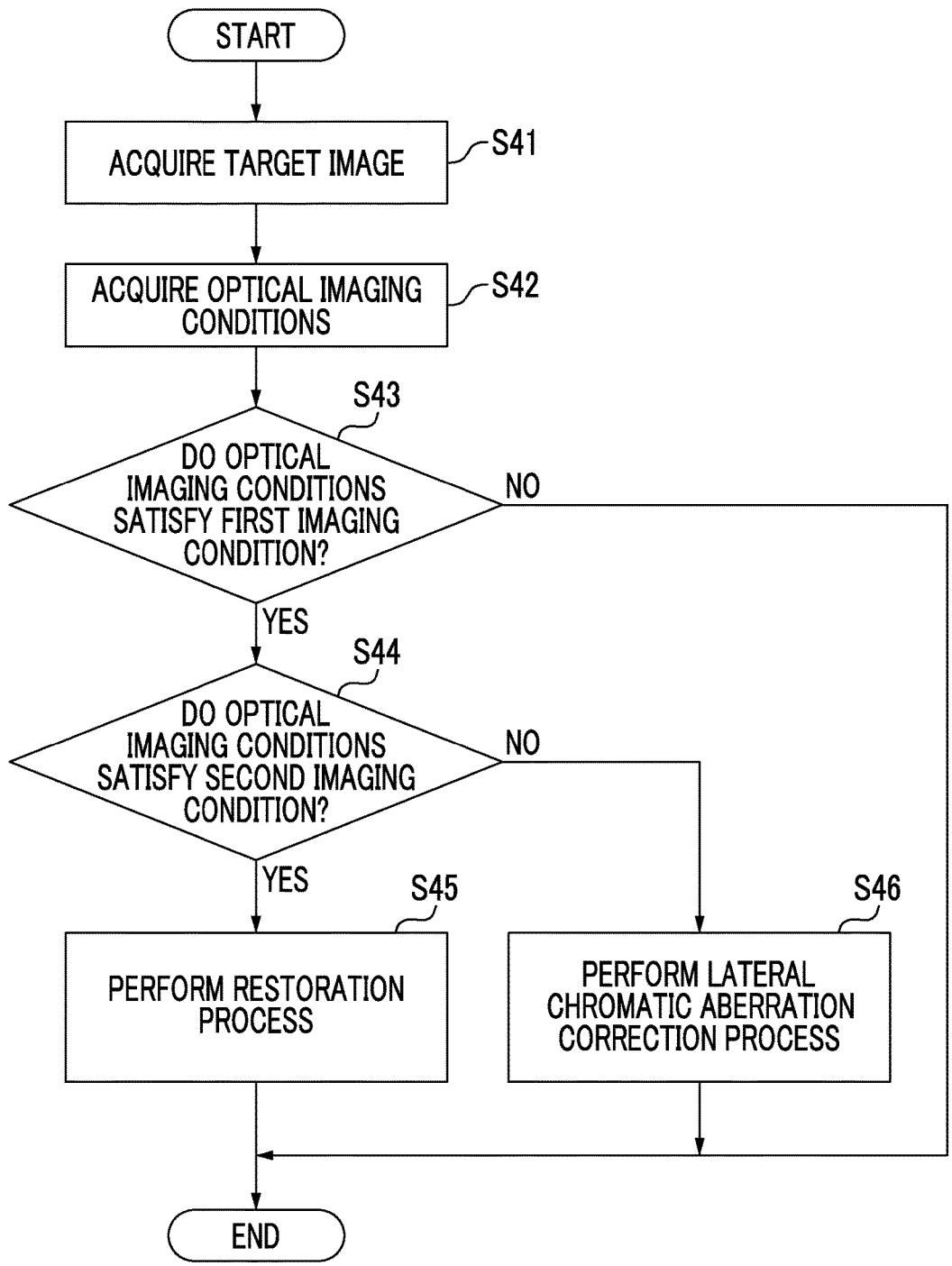
FIG. 23 is a flowchart illustrating an example of image processing according to a fourth mode.

FIG. 23 is a flowchart illustrating an example of the image processing according to the fourth mode.

In this mode, similarly to the first to third modes, the sharpening processing unit 41 of the image processing device 40 acquires a target image (S41 in FIG. 23) and acquires optical imaging conditions (S42).

Then, the sharpening processing unit 41 determines whether the optical imaging conditions satisfy the conditions 1 to 3 (first imaging condition) (S43). In a case in which it is determined that the conditions 1 to 3 (first imaging condition) are satisfied (YES in S43), it is determined whether the optical imaging conditions satisfy the condition 4 (second imaging condition) (S44). As described above, in Step S44, "the determination whether the optical imaging conditions satisfy the condition 4 (second imaging condition) and "the determination whether the optical imaging conditions do not satisfy the condition 5 (third imaging condition)" are performed.

In a case in which the condition 4 (second imaging condition) is satisfied (YES in S44), the sharpening processing unit 41 performs "the restoration process based on the optical transfer function" for the target image (S45). On the other hand, in a case in which the condition 4 (second imaging condition) is not satisfied (NO in S44), that is, in a case in which the condition 5 (third imaging condition) is satisfied, the sharpening processing unit 41 performs the lateral chromatic aberration correction process for the target image (S46).

A detailed method for the lateral chromatic aberration correction process performed by the sharpening processing unit 41 is not particularly limited. For example, the sharpening processing unit 41 may perform the lateral chromatic aberration correction process on the basis of the optical transfer function of the optical system 16. In a case in which the target image includes at least a first color component and a second color component, the sharpening processing unit 41 may apply a restoration filter which is based on the optical transfer function of the optical system 16 related to the first color component to the first color component and apply a restoration filter which is based on the optical transfer function of the optical system 16 related to the second color component to the second color component to perform the lateral chromatic aberration correction process. For example, in a case in which the target image is formed by RGB data, the sharpening processing unit 41 may apply a restoration filter which is based on the optical transfer function of the optical system 16 related to an R component to the R component of the target image, apply a restoration filter which is based on the optical transfer function of the optical system 16 related to a G component to the G component of the target image, and apply a restoration filter which is based on the optical transfer function of the optical system 16 related to a B component to the B component of the target image to perform the lateral chromatic aberration correction process.

In this example, in a case in which at least some of the conditions 1 to 3 (first imaging condition) are not satisfied (NO in S43), the restoration process (see S45) and the lateral chromatic aberration correction process (see S46) are skipped.

As described above, according to this mode, in a case in which the condition 4 (second imaging condition) represented by the above-mentioned Expression 1 is satisfied, the restoration process based on the optical transfer function is performed. On the other hand, in a case in which the condition 4 (second imaging condition) is not satisfied, the lateral chromatic aberration correction process is performed. As such, it is possible to further improve both the quality of the target image captured on the telephoto side and the quality of the target image captured on the wide-angle side, using image processing.

<Fifth Mode>

In this mode, the same or similar elements as those in the fourth mode are denoted by the same reference numerals and the detailed description thereof will not be repeated.

In this mode, in a case in which the conditions 1 to 3 (first imaging condition) are satisfied and the condition 4 (second imaging condition) is not satisfied, the sharpening processing unit 41 does not perform a "lateral chromatic aberration correction process (see S67 in FIG. 25)", but performs "the restoration process based on the optical transfer function" as the sharpening process for a target image.

In this mode, the content of "the restoration process (first restoration process) in a case in which the condition 4 (second imaging condition) is satisfied" is different from the content of "the restoration process (second restoration process) in a case in which the condition 4 (second imaging condition) is not satisfied". Specifically, in a case in which optical imaging conditions satisfy the conditions 1 to 3 (first imaging condition) and do not satisfy the condition 4 (second imaging condition) represented by the above-mentioned Expression 1 (that is, the optical imaging conditions satisfy the condition 5 (third imaging condition) represented by the above-mentioned Expression 16), the sharpening processing unit 41 performs the restoration process based on the optical transfer function of the optical system 16 for only a region of the target image in which the distance from the center of the target image is equal to or greater than 80% of half of the length of the diagonal line of the imaging surface.

Figure 24:
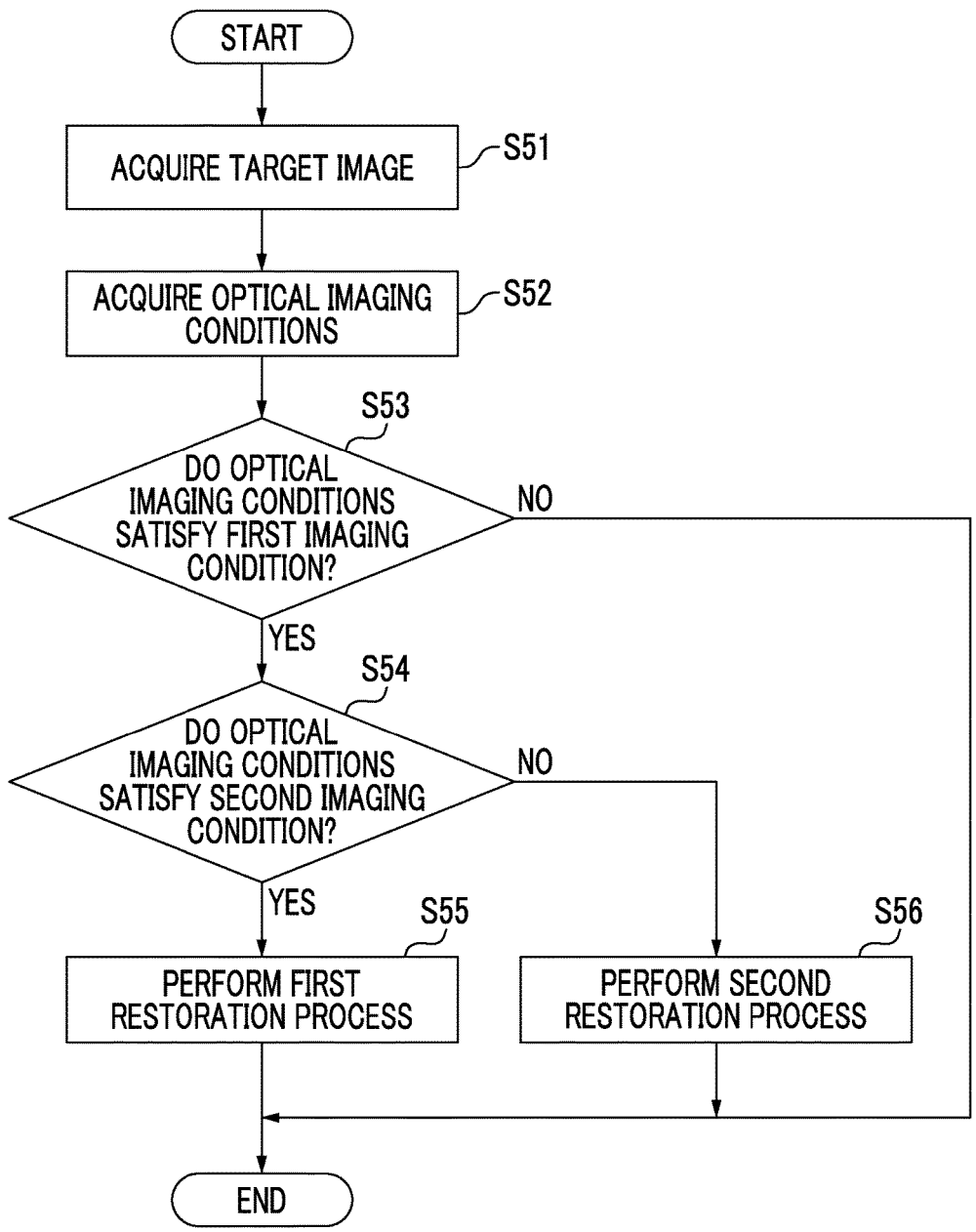
FIG. 24 is a flowchart illustrating an example of image processing according to a fifth mode.

FIG. 24 is a flowchart illustrating an example of image processing according to the fifth mode.

In this mode, similarly to the fourth mode, the sharpening processing unit 41 of the image processing device 40 acquires a target image (S51 in FIG. 24) and acquires optical imaging conditions (S52).

Then, the sharpening processing unit 41 determines whether the optical imaging conditions satisfy the conditions 1 to 3 (first imaging condition) (S53). In a case in which it is determined that the conditions 1 to 3 (first imaging condition) are satisfied (YES in S53), it is determined whether the optical imaging conditions satisfy the condition 4 (second imaging condition) (S54). As described above, in Step S54, "the determination whether the optical imaging conditions satisfy the condition 4 (second imaging condition) and "the determination whether the optical imaging conditions do not satisfy the condition 5 (third imaging condition)" are performed.

In a case in which the condition 4 (second imaging condition) is satisfied (YES in S54), the sharpening processing unit 41 performs "the restoration process (first restoration process) based on the optical transfer function" for the target image (S55). In this example, the "first restoration process (see S55)" is performed for the entire target image and the sharpening processing unit 41 applies a restoration filter created on the basis of the optical transfer function to all of the pixels forming the target image.

On the other hand, in a case in which the condition 4 (second imaging condition) is not satisfied (NO in S54), that is, in a case in which the condition 5 (third imaging condition) is satisfied, the sharpening processing unit 41 performs "the restoration process (second restoration process) based on the optical transfer function" for the target image (S56). In this example, the "second restoration process" is performed for only a portion of the target image and the sharpening processing unit 41 applies the restoration filter created on the basis of the optical transfer function to only the pixels forming an outer circumferential portion which is a partial region of the target image.

In this example, in a case in which the optical imaging conditions do not satisfy at least some of the conditions 1 to 3 (first imaging condition) (NO in S53), the first restoration process (see S55) and the second restoration process (see S56) are skipped.

As described above, according to this mode, in a case in which the condition 4 (second imaging condition) is not satisfied, the restoration process based on the optical transfer function is performed for only a partial region of the target image. In particular, the restoration process is performed for only a region of an image in which image quality is likely to be degraded due to, for example, the influence of the aberration of the optical system 16. Therefore, it is possible to further improve the quality of the target image captured on the wide-angle side, using image processing, while effectively preventing image quality from being damaged by the restoration process.

<Sixth Mode>

In this mode, the same or similar elements as those in the fourth and fifth modes are denoted by the same reference numerals and the detailed description thereof will not be repeated.

In the fourth and fifth modes, in a case in which the optical imaging conditions do not satisfy the condition 4 (second imaging condition) (see NO in S44 of FIG. 23 and NO in S54 of FIG. 24), the lateral chromatic aberration correction process (S46 in FIG. 23) or the second restoration process (S56 in FIG. 24) is performed. In contrast, in this mode, in a case in which the optical imaging conditions do not satisfy the condition 4 (second imaging condition), it is determined whether the optical imaging conditions satisfy the condition 5 (third imaging condition). Only in a case in which the condition 5 (third imaging condition) is satisfied, the lateral chromatic aberration correction process or the second restoration process is performed.

In a case in which the second imaging condition is correlated with the third imaging condition, "that the second imaging condition is satisfied" is equivalent to "that the third imaging condition is not satisfied", and "that the second imaging condition is not satisfied" is equivalent to "that the third imaging condition is satisfied", it is possible to preferably use the fourth mode and the fifth mode. In contrast, in a case in which "that the second imaging condition is satisfied" is not equivalent to "that the third imaging condition is not satisfied" or in a case in which "that the second imaging condition is not satisfied" is not equivalent to "that the third imaging condition is satisfied", it is preferable that "the determination whether the third imaging condition is satisfied" is performed separately from "the determination whether the second imaging condition is satisfied" to determine whether to perform the lateral chromatic aberration correction process or the second restoration process, as in this mode.

The third imaging condition is not particularly limited and may be a condition related to the focal length when the target image is captured or other conditions.

Figure 25:
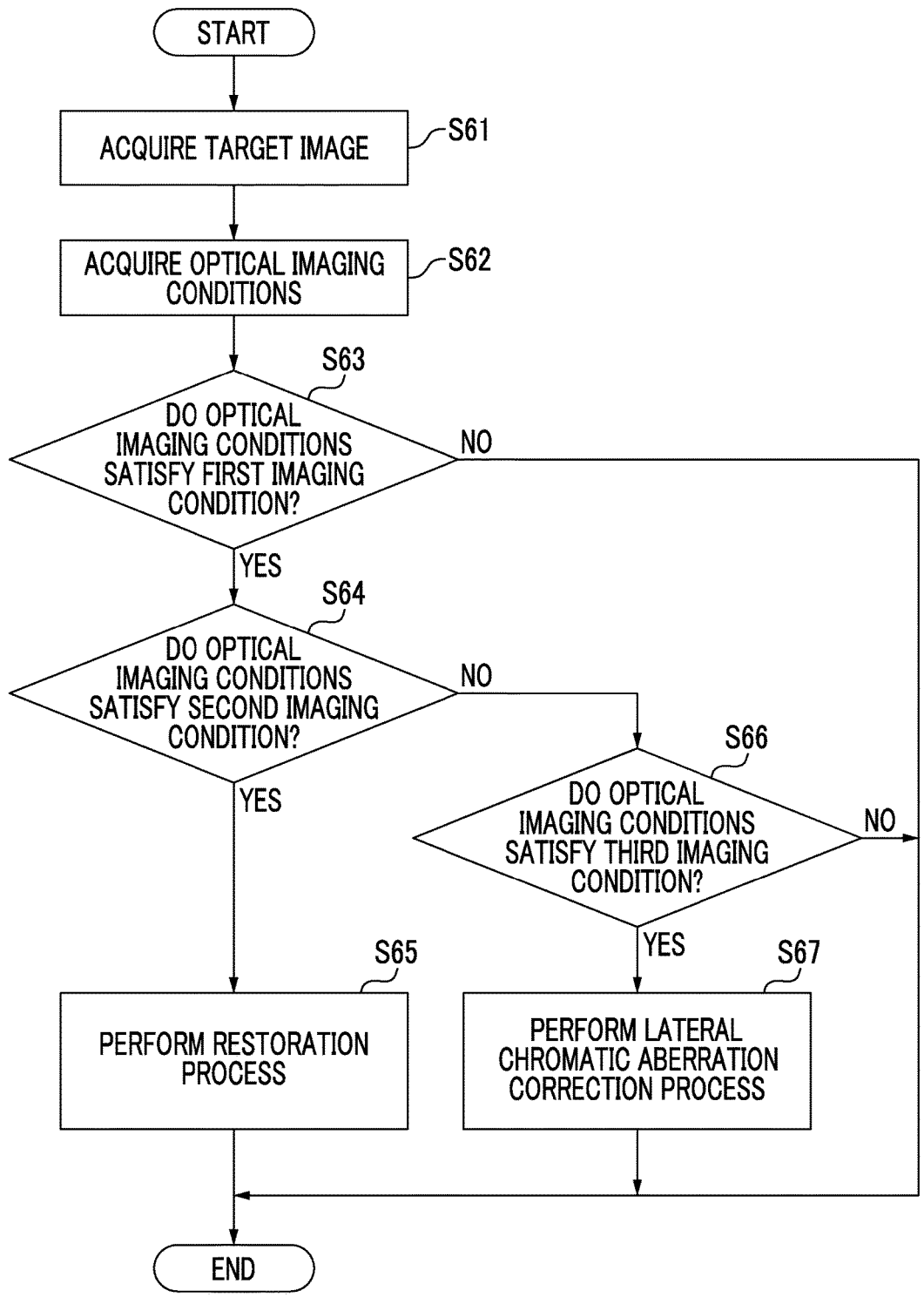
FIG. 25 is a flowchart illustrating an example of image processing according to a sixth mode.

FIG. 25 is a flowchart illustrating an example of image processing according to the sixth mode.

In this mode, similarly to the fourth mode (see FIG. 23), the sharpening processing unit 41 acquires a target image (S61 in FIG. 25), acquires optical imaging conditions (S62), and determines whether the optical imaging conditions satisfy the conditions 1 to 3 (first imaging condition) (S63). In a case in which at least some of the conditions 1 to 3 (first imaging condition) are not satisfied (NO in S63), a process (see S64 to S67) which will be described below is skipped. On the other hand, in a case in which the conditions 1 to 3 (first imaging condition) are satisfied (YES in S63), the sharpening processing unit 41 determines whether the optical imaging conditions satisfy the condition 4 (second imaging condition) (S64). In a case in which in the condition 4 (second imaging condition) is satisfied (YES in S64), the restoration process is performed (S65).

On the other hand, in a case in which the condition 4 (second imaging condition) is not satisfied (NO in S64), the sharpening processing unit 41 determines whether the optical imaging conditions satisfy the condition 5 (third imaging condition) (S66). In a case in which the condition 5 (third imaging condition) is satisfied (YES in S66), the sharpening processing unit 41 performs the lateral chromatic aberration correction process as the sharpening process (S67). In a case in which the condition 5 (third imaging condition) is not satisfied (NO in S66), the restoration process (see S65) and the lateral chromatic aberration correction process (see S67) are skipped.

Figure 26:
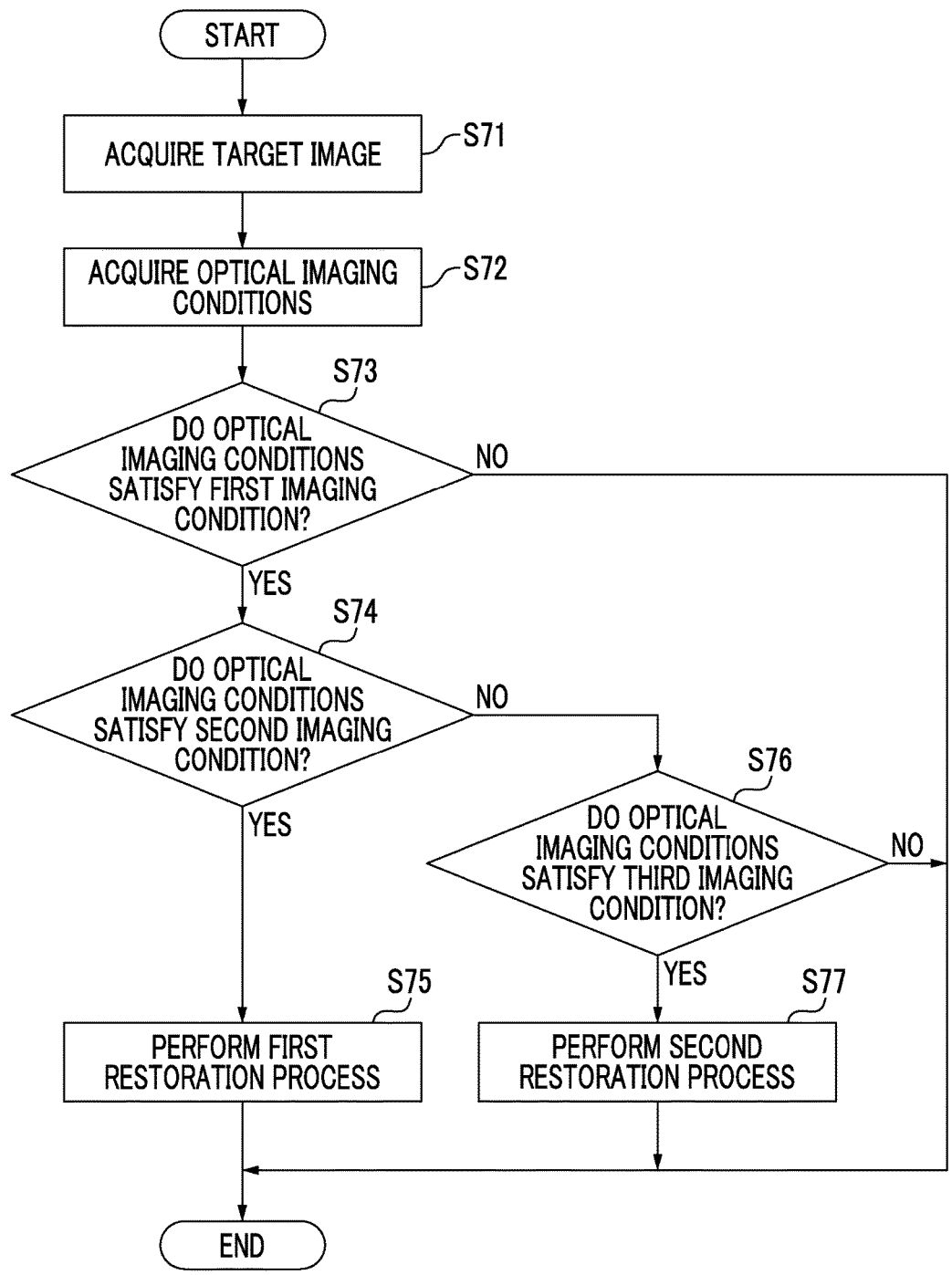
FIG. 26 is a flowchart illustrating another example of the image processing according to the sixth mode.

FIG. 26 is a flowchart illustrating an example of image processing according to the sixth mode.

In this mode, similarly to the fifth mode (see FIG. 24), the sharpening processing unit 41 acquires a target image (S71 in FIG. 26), acquires optical imaging conditions (S72), and determines whether the optical imaging conditions satisfy the conditions 1 to 3 (first imaging condition) (S73). In a case in which at least some of the conditions 1 to 3 (first imaging condition) are not satisfied (NO in S73), a process (see S74 to S77) which will be described below is skipped. On the other hand, in a case in which the conditions 1 to 3 (first imaging condition) are satisfied (YES in S73), the sharpening processing unit 41 determines whether the optical imaging conditions satisfy the condition 4 (second imaging condition) (S74). In a case in which in the condition 4 (second imaging condition) is satisfied (YES in S74), the first restoration process is performed (S75).

On the other hand, in a case in which the condition 4 (second imaging condition) is not satisfied (NO in S74), the sharpening processing unit 41 determines whether the optical imaging conditions satisfy the condition 5 (third imaging condition) (S76). In a case in which the condition 5 (third imaging condition) is satisfied (YES in S76), the sharpening processing unit 41 performs the second restoration process as the sharpening process (S77). In a case in which the condition 5 (third imaging condition) is not satisfied (NO in S76), the first restoration process (see S75) and the second restoration process (see S77) are skipped.

OTHER MODIFICATION EXAMPLES

The application of the invention is not limited to the above-described embodiments and the above-described embodiments may be modified in various ways.

For example, the restoration process based on the optical transfer function may be performed in a case in which the optical imaging conditions satisfy the first imaging condition and the second imaging condition and satisfy the condition that the entire angle of view of the optical system 16 at the wide-angle end is greater than 100 degrees.

In addition, the restoration process based on the optical transfer function may be performed in a case in which the optical imaging conditions satisfy the first imaging condition and the second imaging condition and satisfy the condition that the spatial frequency at which the value of the MTF acquired using the evaluation wavelength in a region of the image formation plane of the optical system 16 in which the distance from the center of the image formation plane is equal to or greater than 70% of half of the length of the diagonal line of the imaging surface of the imaging element 22 is equal to or less than 30% is higher at the wide-angle end than at the telephoto end of the optical system 16.

The above-mentioned modes may be combined with each other. For example, the third mode may be combined with other modes. That is, the restoration process (see S45 in FIG. 23 and S65 in FIG. 25) in the fourth mode and the sixth mode and the first restoration process (see S55 in FIG. 24 and S75 in FIG. 26) and/or the second restoration process (see S56 in FIG. 24 and S77 in FIG. 26) in the fifth mode and the sixth mode may be performed for the brightness component of the target image.

Each of the above-mentioned functional configurations can be implemented by arbitrary hardware, arbitrary software, or a combination thereof. For example, each functional configuration can be implemented by appropriately combining a central processing unit (CPU), a volatile random access memory (RAM), a non-volatile memory, such as an electrically erasable programmable read-only memory (EEPROM), and/or various operation programs, such as an operating system (OS) or an application program. In addition, the invention can be applied to a program that causes a computer to perform the procedure of various processes related to an image processing method and an imaging method in each unit of the imaging device (image processing device 40), a computer-readable recording medium (non-transitory tangible recording medium) that stores the program, or a computer in which the program can be installed.

The aspect to which the invention can be applied is not limited to the surveillance camera system 20 (camera device 10) illustrated in FIGS. 1 and 2, the digital camera 50 illustrated in FIGS. 7 and 8, and the computer 60 illustrated in FIG. 9.

For example, the invention can also be applied to mobile devices having functions (a call function, a communication function, or other computer functions) other than the imaging function as well as the imaging function, in addition to cameras having the imaging function as a main function. For example, mobile phones, smart phones, personal digital assistants (PDA), and portable game machines having a camera function can be given as another aspect to which the invention can be applied. Next, an example of the smart phone to which the invention can be applied will be described.

<Configuration of Smart Phone>

Figure 27:
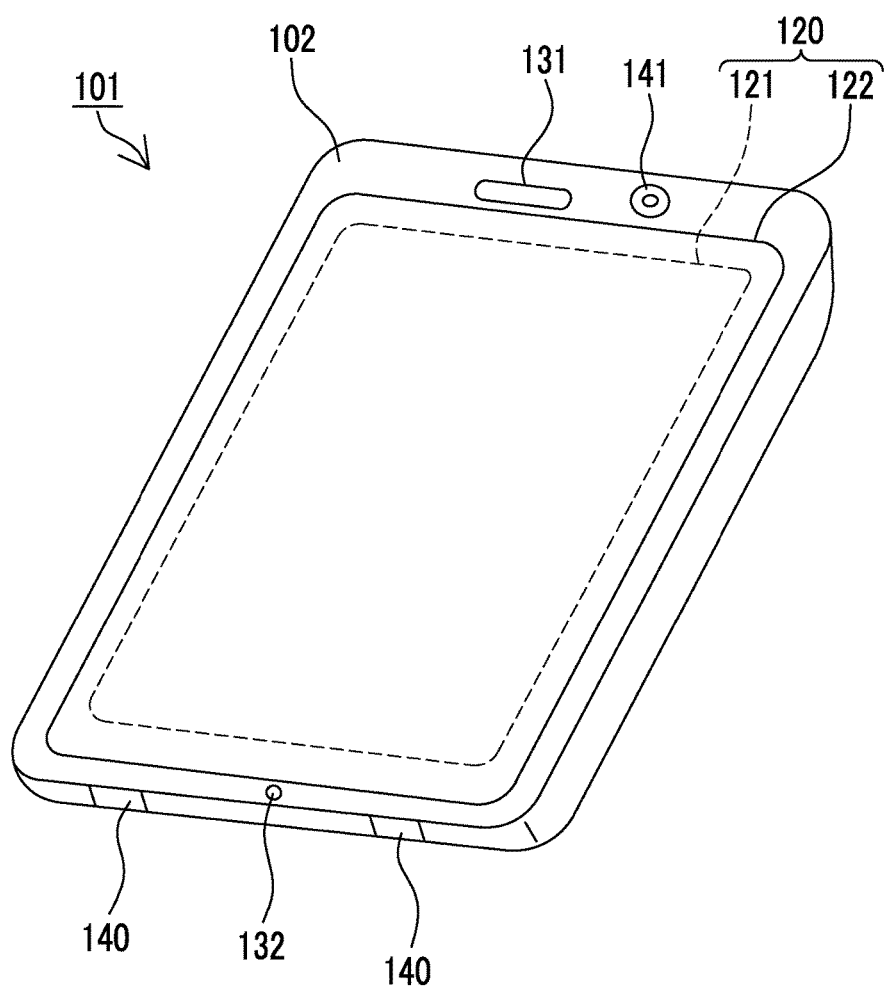
FIG. 27 is a diagram illustrating the outward appearance of a smart phone which is an embodiment of the imaging device according to the invention.

FIG. 27 illustrates the outward appearance of a smart phone 101 which is an embodiment of the imaging device according to the invention. The smart phone 101 illustrated in FIG. 27 includes a housing 102 with a flat panel shape. The smart phone 101 includes a display input unit 120 having a display panel 121 as a display unit and an operation panel 122 as an input unit which are integrally formed on one surface of the housing 102. The housing 102 includes a speaker 131, a microphone 132, an operation unit 140, and a camera unit 141. However, the configuration of the housing 102 is not limited thereto. For example, the display unit and the input unit may be independently provided or the housing 102 may have a folding structure or a sliding structure.

Figure 28:
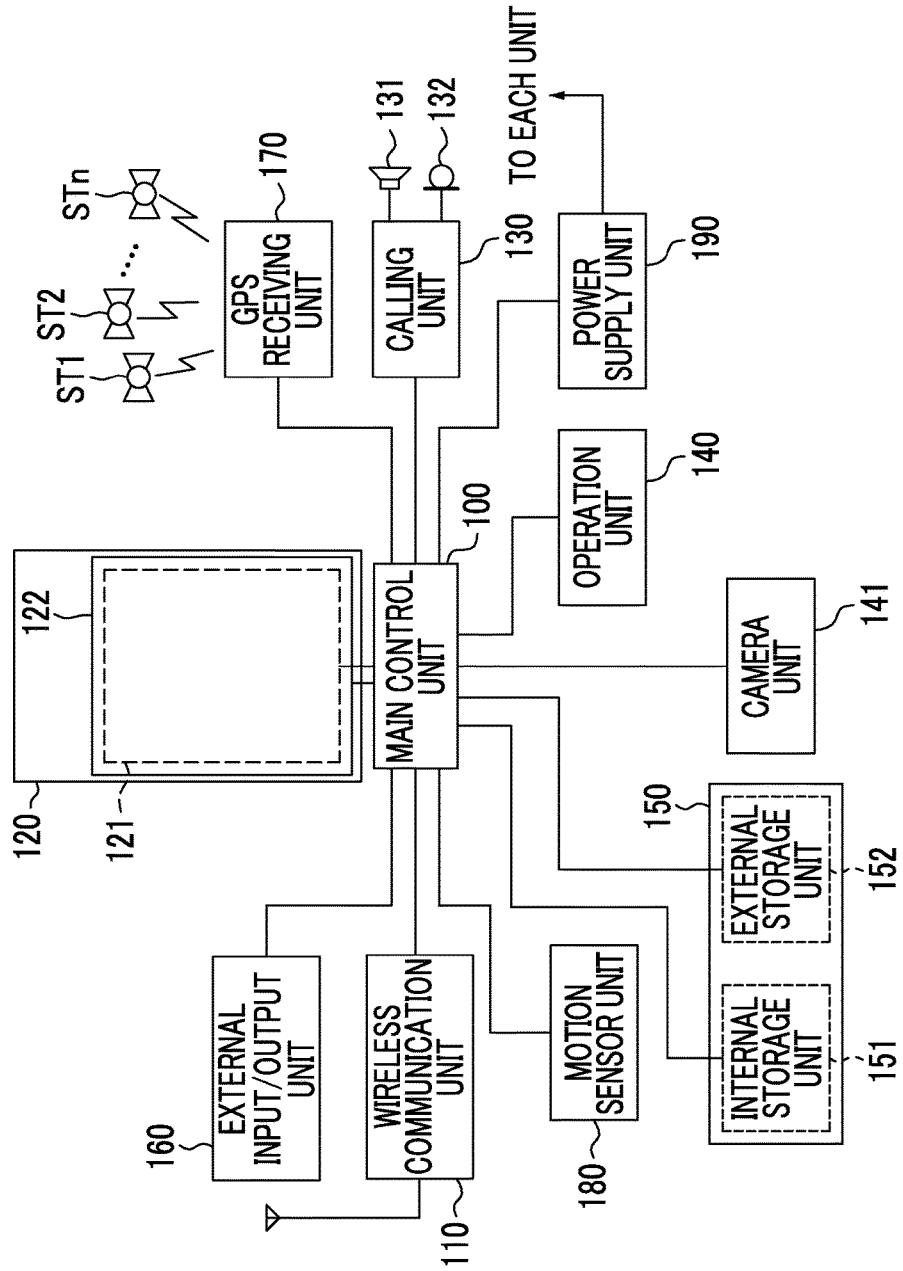
FIG. 28 is a block diagram illustrating the configuration of the smart phone illustrated in FIG. 27.

FIG. 28 is a block diagram illustrating the structure of the smart phone 101 illustrated in FIG. 27. As illustrated in FIG. 28, the smart phone 101 includes, as main components, a wireless communication unit 110, the display input unit 120, a calling unit 130, the operation unit 140, the camera unit 141, a storage unit 150, an external input/output unit 160, a global positioning system (GPS) receiving unit 170, a motion sensor unit 180, a power supply unit 190, and a main control unit 100. In addition, the smart phone 101 has, as a main function, a wireless communication function which performs mobile wireless communication through a base station apparatus and a mobile communication network.

The wireless communication unit 110 performs wireless communication with the base station apparatus which is accommodated in the mobile communication network in response to a command from the main control unit 100. The wireless communication is used to transmit and receive various types of file data, such as voice data and image data, and electronic mail data or to receive, for example, web data or streaming data.

The display input unit 120 is a so-called touch panel including the display panel 121 and the operation panel 122. The display input unit 120 displays, for example, images (still images and motion pictures) or text information to visually transmit information to the user and detects the user's operation for the displayed information under the control of the main control unit 100.

The display panel 121 uses, for example, a liquid crystal display (LCD) or an organic electro-luminescence display (OELD) as a display device. The operation panel 122 is a device that is provided such that an image displayed on a display surface of the display panel 121 can be visually recognized and detects one or a plurality of coordinate points operated by a finger of the user or a stylus. In a case in which the device is operated by a finger of the user or a stylus, the operation panel 122 outputs a detection signal which is generated by the operation to the main control unit 100. Then, the main control unit 100 detects an operation position (coordinates) on the display panel 121 on the basis of the received detection signal.

As illustrated in FIG. 27, the display panel 121 and the operation panel 122 of the smart phone 101 which is an embodiment of the imaging device according to the invention are integrated to form the display input unit 120 and the operation panel 122 is provided so as to completely cover the display panel 121. In a case in which this arrangement is used, the operation panel 122 may have a function of detecting the user's operation even in a region other than the display panel 121. In other words, the operation panel 122 may include a detection region (hereinafter, referred to as a "display region") for an overlap portion which overlaps the display panel 121 and a detection region (hereinafter, referred to as a "non-display region") for an outer edge portion which does not overlap the display panel 121.

The size of the display region may be exactly equal to the size of the display panel 121. However, the sizes are not necessarily equal to each other. The operation panel 122 may include two sensitive regions, that is, an outer edge portion and an inner portion other than the outer edge portion. The width of the outer edge portion is appropriately designed according to, for example, the size of the housing 102. Examples of a position detection method which is used in the operation panel 122 include a matrix switching method, a resistive film method, a surface elastic wave method, an infrared method, an electromagnetic induction method, and a capacitive sensing method. Any of the methods may be used.

The calling unit 130 includes the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 27, for example, the speaker 131 can be mounted on the same surface as the display input unit 120 and the microphone 132 can be mounted on the side surface of the housing 102.

The operation unit 140 is a hardware key which uses, for example, a key switch and receives commands from the user. For example, as illustrated in FIG. 27, the operation unit 140 is a push button switch which is mounted on the side surface of the housing 102 of the smart phone 101, is turned on in a case in which it is pressed by, for example, a finger, and is turned off by the restoring force of a spring in a case in which the finger is taken off.

The storage unit 150 stores a control program or control data of the main control unit 100, application software, address data which is associated with, for example, the names or phone numbers of communication partners, transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152, which has a slot for a detachable external memory. Each of the internal storage unit 151 and the external storage unit 152 forming the storage unit 150 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) or IEEE1394 defined by The Institute of Electrical and Electronics Engineers, Inc. (IEEE)) or a network (for example, the Internet, a wireless LAN, a Bluetooth (registered trademark) network, a radio frequency identification (RFID) network, an Infrared Data Association (IrDA) (registered trademark) network, an Ultra Wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone is connected wirelessly or in a wired manner. The external input/output unit 160 may transmit data received from the external apparatus to each component of the smart phone 101 or may transmit data in the smart phone 101 to the external apparatus.

The GPS receiving unit 170 receives GPS signals transmitted from GPS satellites ST1, ST2, . . . , STn and performs a position measurement process on the basis of a plurality of received GPS signals to detect a position including the latitude, longitude, and height of the smart phone 101, in response to a command from the main control unit 100. In a case in which the GPS receiving unit 170 can acquire positional information from the wireless communication unit 110 and/or the external input/output unit 160 (for example, a wireless local area network (LAN)), it can detect the position using the positional information.

The motion sensor unit 180 includes, for example, a triaxial acceleration sensor and detects the physical movement of the smart phone 101 in response to a command from the main control unit 100. The physical movement of the smart phone 101 is detected to detect the moving direction or acceleration of the smart phone 101. The detection result is output to the main control unit 100.

The power supply unit 190 supplies power accumulated in a battery (not illustrated) to each unit of the smart phone 101 in response to a command from the main control unit 100.

The main control unit 100 includes a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150.

Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays a video on the display input unit 120 on the basis of image data (still image data or motion picture data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operation unit 140 and the operation panel 122.

The main control unit 100 performs the display control to display a software key, such as an icon for starting application software or a scroll bar, or to display a window for creating electronic mail. The scroll bar means a software key for receiving a command to move a displayed portion of an image that is too large to fit into the display region of the display panel 121.

The main control unit 100 performs the operation detection control to detect the operation of the user input through the operation unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera that electronically captures images using an imaging element such as a complementary metal oxide semiconductor (CMOS) sensor. In addition, the camera unit 141 can convert captured image data into image data compressed in, for example, a joint photographic experts (JPEG) format, record the image data in the storage unit 150, or output the image data through the external input/output unit 160 or the wireless communication unit 110, under the control of the main control unit 100. In the smart phone 101 illustrated in FIG. 27, the camera unit 141 is mounted on the same surface as the display input unit 120. However, the mounting position of the camera unit 141 is not limited thereto. For example, the camera unit 141 is not mounted on the front surface of the housing 102 on which the display input unit 120 is provided, but may be mounted on the rear surface of the housing 102. Alternatively, a plurality of camera units 141 may be mounted on the housing 102. In a case in which the plurality of camera units 141 are mounted, the camera units 141 used for imaging may be switched such that the independent camera unit 141 captures images or the plurality of camera units 141 may be used at the same time to capture images.

The camera unit 141 can be used for various functions of the smart phone 101. For example, the image acquired by the camera unit 141 may be displayed on the display panel 121 or the image acquired by the camera unit 141 may be used as one of the operation input methods of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

In addition, for example, the positional information acquired by the GPS receiving unit 170, the voice information acquired by the microphone 132 (for example, the voice information may be converted into text information by the main control unit), and the posture information acquired by the motion sensor unit 180 may be added to still image data or motion picture data and the image data may be recorded in the storage unit 150 or may be output through the external input/output unit 160 or the wireless communication unit 110.

The image processing device 40 (particularly, the sharpening processing unit 41) can be implemented by, for example, the main control unit 100.

EXPLANATION OF REFERENCES

10: camera device
12: imaging unit
12A: imaging support unit
14A: support frame
14B: mount
14: support unit
16: optical system
18: control panel
20: surveillance camera system
22: imaging element
23: camera-side control processing unit
24: camera-side communication unit
30: control terminal
31: user interface
32: terminal-side control processing unit
33: terminal-side communication unit
40: image processing device
41: sharpening processing unit
42: image acquisition unit
43: condition acquisition unit
50: digital camera
51: imaging control processing unit
52: communication unit
53: imaging user interface
54: main body unit
55: optical system control unit
56: optical system input/output unit
57: main body control unit
58: optical system mounting unit
59: main body input/output unit
60: computer
61: computer control processing unit 62: computer input/output unit
63: computer user interface
100: main control unit
101: smart phone
102: housing
110: wireless communication unit
120: display input unit
121: display panel
122: operation panel
130: calling unit
131: speaker
132: microphone
140: operation unit
141: camera unit
150: storage unit
151: internal storage unit
152: external storage unit
160: external input/output unit
170: GPS receiving unit
180: motion sensor unit
190: power supply unit

What is claimed is:

1. An imaging device comprising:
an optical system;
an imaging element that receives imaging light through the optical system and outputs a target image; and
a sharpening processing unit that performs a sharpening process for the target image on the basis of optical imaging conditions indicating information of the optical system when the target image is captured, wherein:
a focal length of the optical system is variable;
an entire angle of view of the optical system at a wide-angle end is greater than 90 degrees;
a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane is equal to or greater than 80% and less than 95% of half of a length of a diagonal line of an imaging surface of the imaging element is equal to or less than 30% is higher at the wide-angle end than at a telephoto end of the optical system;
in a case in which the focal length of the optical system when the target image is captured is represented by F, the focal length of the optical system at the wide-angle end is represented by Fw, and the focal length of the optical system at the telephoto end is represented by Ft, the sharpening processing unit determines whether a condition represented by $F \geq \sqrt{(Fw \times Ft)}$ is satisfied on the basis of the optical imaging conditions; and
in a case in which the condition represented by $F \geq \sqrt{(Fw \times Ft)}$ is satisfied, the sharpening processing unit performs a restoration process based on an optical transfer function of the optical system as the sharpening process.

2. An image processing device comprising:
an image acquisition unit that acquires a target image;
a condition acquisition unit that acquires optical imaging conditions indicating information of an optical system when the target image is captured; and
a sharpening processing unit that performs a sharpening process for the target image on the basis of the optical imaging conditions, wherein:
in a case in which the optical imaging conditions satisfy a first imaging condition and a second imaging condition, the sharpening processing unit performs a restoration process based on an optical transfer function of the optical system as the sharpening process;
the first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane is equal to or greater than 80% and less than 95% of half of a length of a diagonal line of an imaging surface of the imaging element is equal to or less than 30% is higher at the wide-angle end than at a telephoto end of the optical system; and
in a case in which the focal length of the optical system when the target image is captured is represented by F, the focal length of the optical system at the wide-angle end is represented by Fw, and the focal length of the optical system at the telephoto end is represented by Ft, the second imaging condition is represented by $F \geq \sqrt{(Fw \times Ft)}$.

3. The image processing device according to claim 2, wherein in a case in which the optical imaging conditions satisfy the first imaging condition and satisfy the third imaging condition represented by $F < \sqrt{(Fw \times Ft)}$, the sharpening processing unit performs the restoration process for only a region of the target image in which a distance from a center of the target image is equal to or greater than 80% of half of the length of the diagonal line of the imaging surface.

4. The image processing device according to claim 2, wherein the restoration process is performed in a case in which the optical imaging conditions satisfy the first imaging condition and the second imaging condition and satisfy a condition that the entire angle of view of the optical system at the wide-angle end is greater than 100 degrees.

5. The image processing device according to claim 2, wherein the restoration process is performed in a case in which the optical imaging conditions satisfy the first imaging condition and the second imaging condition and satisfy a condition that the spatial frequency at which the value of the MTF acquired using the evaluation wavelength in a region of the image formation plane of the optical system in which the distance from the center of the image formation plane is equal to or greater than 70% of half of the length of the diagonal line of the imaging surface is equal to or less than 30% is higher at the wide-angle end than at the telephoto end of the optical system.

6. An imaging device comprising:
an optical system mounting unit to which an optical system is detachably attached;
an imaging element that receives imaging light through the optical system mounted on the optical system mounting unit and outputs an image; and
the image processing device according to claim 2,
wherein the image output from the imaging element is the target image.

7. An imaging device comprising:
a camera device including an optical system, an imaging element that receives imaging light through the optical system and outputs an image, a camera-side control processing unit that is connected to the imaging element, and a camera-side communication unit that is connected to the camera-side control processing unit; and a control terminal including a terminal-side communication unit that can communicate with the camera-side communication unit, a terminal-side control processing unit that is connected to the terminal-side communication unit, and a user interface that is connected to the terminal-side control processing unit, wherein:

at least one of the camera-side control processing unit or the terminal-side control processing unit includes the image processing device according to claim 2; and the image output from the imaging element is the target image.

8. The image processing device according to claim 2, wherein, in a case in which the optical imaging conditions satisfy the first imaging condition and satisfy a third imaging condition represented by $F<\sqrt{(Fw \times Ft)}$, the sharpening processing unit performs a lateral chromatic aberration correction process as the sharpening process.

9. The image processing device according to claim 8, wherein the sharpening processing unit adjusts a magnification of a color component forming the target image to perform the lateral chromatic aberration correction process.

10. The image processing device according to claim 8, wherein the sharpening processing unit performs the lateral chromatic aberration correction process on the basis of the optical transfer function.

11. The image processing device according to claim 10, wherein:

the target image includes at least a first color component and a second color component; and the sharpening processing unit applies a filter based on the optical transfer function which is related to the first color component to the first color component, applies a filter based on the optical transfer function which is related to the second color component to the second color component to perform the lateral chromatic aberration correction process.

12. The image processing device according to claim 2, wherein the sharpening processing unit acquires a brightness component of the target image and performs the restoration process for only the brightness component.

13. An imaging device comprising:

an optical system mounting unit to which an optical system is detachably attached;

an imaging element that receives imaging light through the optical system mounted on the optical system mounting unit and outputs an image; and the image processing device according to claim 12, wherein the image output from the imaging element is the target image.

14. An imaging device comprising:

a camera device including an optical system, an imaging element that receives imaging light through the optical system and outputs an image, a camera-side control processing unit that is connected to the imaging element, and a camera-side communication unit that is connected to the camera-side control processing unit; and a control terminal including a terminal-side communication unit that can communicate with the camera-side communication unit, a terminal-side control processing unit that is connected to the terminal-side communication unit, and a user interface that is connected to the terminal-side control processing unit, wherein:

at least one of the camera-side control processing unit or the terminal-side control processing unit includes the image processing device according to claim 12; and the image output from the imaging element is the target image.

15. The image processing device according to claim 12, wherein, in a case in which the optical imaging conditions satisfy the first imaging condition and satisfy a third imaging condition represented by $F<\sqrt{(Fw \times Ft)}$, the sharpening processing unit performs a lateral chromatic aberration correction process as the sharpening process.

16. The image processing device according to claim 15, wherein the sharpening processing unit adjusts a magnification of a color component forming the target image to perform the lateral chromatic aberration correction process.

17. The image processing device according to claim 15, wherein the sharpening processing unit performs the lateral chromatic aberration correction process on the basis of the optical transfer function.

18. The image processing device according to claim 17, wherein:

the target image includes at least a first color component and a second color component; and the sharpening processing unit applies a filter based on the optical transfer function which is related to the first color component to the first color component, applies a filter based on the optical transfer function which is related to the second color component to the second color component to perform the lateral chromatic aberration correction process.

19. An image processing method comprising:

a step of acquiring a target image;

a step of acquiring optical imaging conditions indicating information of an optical system when the target image is captured; and a step of performing a sharpening process for the target image on the basis of the optical imaging conditions, wherein:

in a case in which the optical imaging conditions satisfy a first imaging condition and a second imaging condition, a restoration process based on an optical transfer function of the optical system is performed as the sharpening process;

the first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane is equal to or greater than 80% and less than 95% of half of a length of a diagonal line of an imaging surface of an imaging element which outputs the target image is equal to or less than 30% is higher at the wide-angle end than at a telephoto end of the optical system; and in a case in which the focal length of the optical system when the target image is captured is represented by F, the focal length of the optical system at the wide-angle end is represented by Fw, and the focal length of the optical system at the telephoto end is represented by Ft, the second imaging condition is represented by $F \geq \sqrt{(Fw \times Ft)}$.

20. A non-transitory computer-readable tangible recording medium that stores a program causing a computer to perform:
  a step of acquiring a target image;
  a step of acquiring optical imaging conditions indicating information of an optical system when the target image is captured; and
  a step of performing a sharpening process for the target image on the basis of the optical imaging conditions, wherein:
  in a case in which the optical imaging conditions satisfy a first imaging condition and a second imaging condition, a restoration process based on an optical transfer function of the optical system is performed as the sharpening process;
  the first imaging condition includes a condition that a focal length of the optical system is variable, a condition that an entire angle of view of the optical system at a wide-angle end is greater than 90 degrees, and a condition that a spatial frequency at which a value of an MTF of the optical system acquired using an evaluation wavelength including a wavelength component of 435.83 nm, a wavelength component of 546.07 nm, and a wavelength component of 656.27 nm in a region of an image formation plane of the optical system in which a distance from a center of the image formation plane is equal to or greater than 80% and less than 95% of half of a length of a diagonal line of an imaging surface of an imaging element which outputs the target image is equal to or less than 30% is higher at the wide-angle end than at a telephoto end of the optical system; and
  in a case in which the focal length of the optical system when the target image is captured is represented by F, the focal length of the optical system at the wide-angle end is represented by Fw, and the focal length of the optical system at the telephoto end is represented by Ft, the second imaging condition is represented by $F \geq \sqrt{(Fw \times Ft)}$.

* * * * *